US00RE49709E

(19) United States
(12) Reissued Patent
Nakagawa et al.

(10) Patent Number: US RE49,709 E
(45) Date of Reissued Patent: *Oct. 24, 2023

(54) BLOWER AND OUTDOOR UNIT OF AIR CONDITIONER COMPRISING SAME

(71) Applicant: SAMSUNG ELECTRONICS CO., LTD., Suwon-si (KR)

(72) Inventors: Suguru Nakagawa, Yokohama (JP); Seiji Sato, Yokohama (JP)

(73) Assignee: SAMSUNG ELECTRONICS CO., LTD., Suwon-si (KR)

( * ) Notice: This patent is subject to a terminal disclaimer.

(21) Appl. No.: 16/184,166

(22) Filed: Nov. 8, 2018

Related U.S. Patent Documents

Reissue of:
(64) Patent No.: 9,822,801
Issued: Nov. 21, 2017
Appl. No.: 15/101,387
PCT Filed: Dec. 2, 2014
PCT No.: PCT/KR2014/011715
§ 371 (c)(1),
(2) Date: Jun. 2, 2016
PCT Pub. No.: WO2015/084030
PCT Pub. Date: Jun. 11, 2015

(30) Foreign Application Priority Data

Dec. 2, 2013 (JP) ..... 2013-249308
Jul. 31, 2014 (JP) ..... 2014-157177
Dec. 2, 2014 (KR) ..... 10-2014-0170184

(51) Int. Cl.
*F04D 29/66* (2006.01)
*F04D 19/00* (2006.01)
(Continued)

(52) U.S. Cl.
CPC ..... *F04D 29/663* (2013.01); *F04D 19/002* (2013.01); *F04D 25/166* (2013.01);
(Continued)

(58) Field of Classification Search
CPC .... F04D 29/544; F04D 29/667; F04D 19/002; F04D 29/542; F04D 29/663;
(Continued)

(56) References Cited

U.S. PATENT DOCUMENTS

RE34,456 E 11/1993 Harmsen
7,775,767 B2 8/2010 Takemoto
(Continued)

FOREIGN PATENT DOCUMENTS

CN 202835597 U 3/2013
CN 104302927 1/2015
(Continued)

OTHER PUBLICATIONS

Chinese Office Action dated Jan. 11, 2019 in Chinese Patent Application No. 201480074746.5.
(Continued)

*Primary Examiner* — Sara S Clarke
(74) *Attorney, Agent, or Firm* — STAAS & HALSEY LLP

(57) ABSTRACT

Provided are a blower, capable of suppressing noise occurring in a stator while significantly improving blowing efficiency, and an outdoor unit using the same. The present disclosure comprises: a bell mouth part spaced apart at a predetermined distance in the radial direction with respect to an outer circumferential end of a propeller fan; and a diffuser part installed on the downstream side of the bell mouth part, and having a flow path area which is enlarged from the upstream side toward the downstream side with a larger magnification rate than the magnification rate of the flow path area in the downstream end of the bell mouth part; and a stator part having a plurality of stators, wherein the stator part is arranged within the diffuser part.

26 Claims, 13 Drawing Sheets

(51) Int. Cl.

| | |
|---|---|
| ***F04D 25/16*** | (2006.01) |
| ***F04D 29/32*** | (2006.01) |
| ***F04D 29/52*** | (2006.01) |
| ***F04D 29/54*** | (2006.01) |
| ***F04D 29/58*** | (2006.01) |
| ***F24F 1/38*** | (2011.01) |
| ***F24F 1/40*** | (2011.01) |
| ***F25B 39/00*** | (2006.01) |
| ***F25D 17/06*** | (2006.01) |
| ***F25B 39/02*** | (2006.01) |

(52) U.S. Cl.

CPC ..... *F04D 29/325* (2013.01); *F04D 29/522* (2013.01); *F04D 29/526* (2013.01); *F04D 29/542* (2013.01); *F04D 29/544* (2013.01); *F04D 29/547* (2013.01); *F04D 29/5833* (2013.01); *F04D 29/666* (2013.01); *F04D 29/667* (2013.01); *F24F 1/38* (2013.01); *F24F 1/40* (2013.01); *F25B 39/00* (2013.01); *F25D 17/067* (2013.01); *F25B 39/028* (2013.01)

(58) Field of Classification Search

CPC .. F04D 29/5833; F04D 25/166; F04D 29/325; F04D 29/526; F04D 29/666; F04D 29/522; F04D 29/547; F25B 39/00; F25B 39/028; F25D 17/067; F24F 1/38; F24F 1/40

See application file for complete search history.

(56) References Cited

U.S. PATENT DOCUMENTS

| | | | | |
|---|---|---|---|---|
| 7,971,448 | B2 | 7/2011 | Kim | |
| 8,092,156 | B2 | 1/2012 | Jang et al. | |
| 2005/0218289 | A1* | 10/2005 | Penlesky | F04D 29/601 248/674 |
| 2006/0045777 | A1 | 3/2006 | Kao | |
| 2006/0105696 | A1 | 5/2006 | Wenger | |
| 2008/0273973 | A1* | 11/2008 | Yamamoto | F04D 29/384 415/220 |
| 2009/0129918 | A1* | 5/2009 | Takeuchi | F04D 25/166 415/199.4 |
| 2010/0269537 | A1* | 10/2010 | Tadokoro | F04D 29/526 62/426 |
| 2011/0114286 | A1* | 5/2011 | Komatsu | B60K 11/04 165/51 |
| 2011/0192186 | A1 | 8/2011 | Kato | |
| 2013/0125579 | A1* | 5/2013 | Okazawa | F24F 1/38 62/507 |
| 2013/0239605 | A1* | 9/2013 | Oh | F04D 25/08 62/428 |
| 2014/0086728 | A1 | 3/2014 | Engert et al. | |
| 2015/0300372 | A1 | 10/2015 | Stephan | |

FOREIGN PATENT DOCUMENTS

| | | | | |
|---|---|---|---|---|
| DE | 102012003336 | | | 8/2013 |
| DE | 102012003336 | A1 | | 8/2013 |
| JP | 05-071768 | | | 3/1993 |
| JP | 6-4399 | | | 1/1994 |
| JP | 10-238817 | | | 9/1998 |
| JP | 10-311561 | | | 11/1998 |
| JP | 11-14101 | | | 1/1999 |
| JP | 2000-130799 | | | 5/2000 |
| JP | 2003-240275 | | | 8/2003 |
| JP | 2003-254565 | | | 9/2003 |
| JP | 2003254565 | A | * | 9/2003 |
| JP | 2006-116321 | | | 5/2006 |
| JP | 2008-180124 | | | 8/2008 |
| JP | 2009-281682 | | | 12/2009 |
| JP | 2010-117044 | | | 5/2010 |
| JP | 2011-112303 | | | 6/2011 |
| JP | 4456347 | | | 4/2012 |
| JP | 2013-096622 | | | 5/2013 |
| JP | 2013-096622 | A | | 5/2013 |
| JP | 2013-113128 | A | | 6/2013 |
| JP | 2013-119816 | | | 6/2013 |
| JP | 2013119816 | A | * | 6/2013 |
| JP | 2013-221439 | | | 10/2013 |
| JP | 2013221439 | A | * | 10/2013 |
| JP | 2014-81147 | | | 5/2014 |
| KR | 1999-021972 | | | 3/1999 |
| KR | 1999-0082694 | | | 11/1999 |
| KR | 10-2000-0019578 | | | 4/2000 |
| KR | 2002-0057598 | | | 7/2002 |
| KR | 10-0573067 | | | 4/2006 |
| KR | 10-2006-0127285 | | | 12/2006 |
| KR | 10-2008-0052973 | | | 6/2008 |
| KR | 10-2009-0067344 | | | 6/2009 |
| KR | 10-2009-0076031 | | | 7/2009 |
| KR | 10-2015-0063944 | | | 12/2014 |
| KR | 10-2015-0063944 | A | | 12/2014 |
| TW | 200609715 | | | 3/2006 |
| UA | 70083 | | | 5/2012 |
| UA | 70083 | U | | 5/2012 |

OTHER PUBLICATIONS

U.S. Notice of Allowance dated Apr. 3, 2019 in U.S. Appl. No. 15/172,027.
U.S. Office Action dated Oct. 31, 2018 in U.S. Appl. No. 15/172,027.
U.S. Office Action dated Jun. 1, 2018 in U.S. Appl. No. 15/172,027.
Korean Notice of Allowance dated Nov. 27, 2018 in Korean Patent Application No. 10-2016-0098300.
Australian Examination Report No. 1 dated Jun. 21, 2017 in related Australian Patent Application No. 2014357992.
U.S. Office Action dated Sep. 23, 2016 in U.S. Appl. No. 15/101,387.
U.S. Office Action dated Mar. 21, 2017 in U.S. Appl. No. 15/101,387.
U.S. Notice of Allowance Jul. 12, 2017 in U.S. Appl. No. 15/101,387.
Russian Decision to Grant dated Dec. 25, 2018 in Russian Patent Application No. 2018109694/06.
Australian Office Action dated Jan. 8, 2019 in Australian Patent Application No. 2018204570.
Chinese Office Action dated Aug. 2, 2019 in Chinese Patent Application No. 201480074746.5.
European Office Action dated Aug. 20, 2019 in European Patent Application No. 17204460.4.
Australian Notice of Acceptance dated Apr. 17, 2019 in Australian Patent Application No. 2018204570.
Chinese Office Action dated May 15, 2019 in Chinese Patent Application No. 201810161062.9.
Indian Office Action dated Sep. 24, 2019 in Indian Patent Application No. 201617022761.
Chinese Office Action dated Jan. 3, 2020 in Chinese Patent Application No. 201810161062.9.
Korean Office Action dated Feb. 28, 2020 in Korean Patent Application No. 10-2017-0062405.
Indian Office Action dated Oct. 5, 2020 in Indian Patent Application No. 201818029076.
European Office Action dated Jan. 12, 2021 from European Application No. 14868679.3, 9 pages.
Japanese Office Action dated Jan. 18, 2022 from Japanese Application No. 2014-157177.
Japanese Office Action dated Feb. 6, 2022 from Japanese Application No. 2014-049672.
European Office Action dated Nov. 2, 2021 from European Application No. 17204460.4.
Korean Notice of Allowance dated Jul. 28, 2021 from Korean Application No. 10-2021-0001774.
International Search Report dated Feb. 26, 2015 from International Application No. PCT/KR2014/011715.
Australian Office Action dated Oct. 25, 2017 from Australian Application No. 2014357992.
Brazilian Office Action dated May 19, 2021 from Brazilian Application No. BR112016012519-3.

(56) References Cited

OTHER PUBLICATIONS

Chinese Office Action dated Dec. 31, 2019 from Chinese Application No. 201780074746.5.
Korean Notice of Allowance dated Apr. 29, 2018 from Korean Application No. 10-2017-0053670.
Korean Notice of Allowance dated Dec. 30, 2020 from Korean Application No. 10-2017-0062405.
Korean Notice of Allowance dated Jul. 28, 2021 from Korean Application No. 10-2017-0001748.
Korean Notice dated Sep. 29, 2021 from Korean Application No. 10-2017-0001765.
Korean Office Action dated Mar. 16, 2021 from Korean Application No. 10-2021-0001748.
Korean Office Action dated Mar. 16, 2021 from Korean Application No. 10-2021-0001765.
Korean Office Action dated Mar. 16, 2021 from Korean Application No. 10-2021-00017774.
European Office Action dated May 4, 2022 from European Application No. 14868679.3.
Chinese Office Action dated Jun. 1, 2022 from Chinese Application No. 201780074746.5.
Chinese Office Action dated Dec. 13, 2021 from Chinese Application No. 201480074746.5.
Brazilian Office Action dated Oct. 13, 2022 in Brazilian Patent Application No. BR122018012928-0 (3 pages: 6 pages English translation).
European Office Action dated Dec. 20, 2022 in European Patent Application No. 14 868 679.3 (7 pages).
Office Action dated Apr. 20, 2023 in European Patent Application No. 14 868 679.3 (5 pages).
European Office Action dated May 12, 2023 in European Patent Application No. 17 204 460.4.
Notice of Allowance dated Jan. 20, 2023 in Chinese Patent Application No. 201480074746.5 ( 4 pages; 3 pages English translation).
Office Action dated Feb. 13, 2023 in Korean Patent Application No. 10-2021-0145364 ( 3 pages; 3 pages English translation).
Korean Office Action dated Jun. 2, 2016 in corresponding Korean Patent Application No. 10-2014-0170184.
U.S. Office Action dated Sep. 13, 2016 in corresponding U.S. Appl. No. 15/172,027.
Korean Office Action dated Oct. 27, 2016 in corresponding Korean Patent Application No. 10-2014-0170184.
Notice of Allowance dated Feb. 24, 2017 in corresponding Korean Patent Application No. 10-2014-0170184.
Advisory Action dated May 4, 2017 in related U.S. Appl. No. 15/172,027.
U.S. Office Action dated Feb. 16, 2017, in corresponding U.S. Appl. No. 15/172,027.
U.S. Appl. No. 15/172,027, filed Jun. 2, 2016, Masaru Nakagawa, Samsung Electronics Co., Ltd.
U.S. Office Action dated Jun. 23, 2017, in related U.S. Appl. No. 15/172,027.
Extended European Search Report dated Jun. 23, 2017 in related European Patent Application No. 14868679.3.
Russian Office Action and Search Report dated Jul. 19, 2017 in related Russian Patent Application No. 2016121624.
Korean Office Action dated Jul. 2, 2017 in corresponding Korean Patent Application No. 10-2014-0170184.

* cited by examiner

AMENDED

AMENDED

AMENDED

AMENDED (a)

(b)

BLOWER AND OUTDOOR UNIT OF AIR CONDITIONER COMPRISING SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a broadening reissue application of U.S. Pat. No. 9,822,801, issued on Nov. 21, 2017, which* is a U.S. national stage application of PCT international application PCT/KR2014/011715 filed on Dec. 2, 2014 and claims the benefit of Japanese Patent Application Nos. JP2013-249308, filed on Dec. 2, 2013, and JP2014-157177, filed on Jul. 31, 2014, and Korean Patent Application No. 10-2014-0170184, filed on Dec. 2, 2014, in the Japan Patent Office and the Korean Intellectual Property Office, respectively, the content of each of the foregoing is incorporated herein by reference.

BACKGROUND

1. Technical Field

The present invention relates to an outdoor unit of an air conditioner and a blower used for the same.

2. Background Art

In a conventional blower, a diffuser part (a ventilation part) extends to a downstream from a cylindrical bell mouth part installed around a propeller fan, for example, as described in Japanese Unexamined Patent Application Publication No. 2013-119816.

However, an air current may not be uniformly introduced into inlet ports installed at an upstream side of the bell mouth part based on an apparatus in which the blower is installed, therefore a suction flow rate may be distributed according to region.

Because of this, blowing efficiency may not be improved more than a certain level, and there is also a problem in that when the number of revolutions of a propeller fan is increased for increasing the suction flow rate, power consumption is increased and noise is generated. Particularly, in a configuration of Patent document 1 in which a noise prevention blade (a stator blade) is installed in a diffuser part, noise generated in the noise prevention blade is also a problem.

Recently, high efficiency has been achieved by heat exchangers being installed in a plurality of parallel rows in an outdoor unit of an air conditioner, and accordingly a plurality of blowers are adjacently disposed to correspond to the heat exchangers. However, this arrangement has caused efficiency to deteriorate or noise to increase, such as air currents which flow from diffuser s collide with each other and interfere with each other.

SUMMARY

The present invention is directed to providing a blower which significantly improves blowing efficiency and suppresses noise and an outdoor unit of an air conditioner using the same.

One aspect of the present disclosure provides a blower including a fan, a container-shaped molded object provided so that a bell mouth part provided to be spaced apart from an outer circumferential surface of the fan and a diffuser part provided to be extended from a downstream end of the bell mouth part are integrally molded, and a molded blade part including a plurality of noise prevention blades and provided at the diffuser part, wherein the diffuser part is provided to be inclined so that an area of a flow path increases toward a downstream end of the diffuser part, and an inclination angle of the diffuser part varies along a circumferential direction of the diffuser part with respect to a rotation shaft of the fan. Another aspect of the present disclosure provides an outdoor unit of an air conditioner including a heat exchanger, the outdoor unit includes a fan having an outer circumferential end coupled to a rotation shaft; a bell mouth part including a downstream end, the bell mouth disposed to be around the outer circumferential end of the fan and spaced apart from the outer circumferential end of the fan; and a diffuser part including: an opening having an inner circumferential surface, an upstream end disposed at the downstream end of the bell mouth part, and a downstream end at which the air is discharged to outside of the outdoor unit, the diffuser part disposed to be extended from the downstream end of the bell mouth part to provide an air flow path of the fan through the opening, from the upstream end of the diffuser part toward the downstream end of the diffuser part. The inner circumferential surface of the diffuser part is inclined at a diffuser angle (θ) with respect to an axis of a rotation of the rotation shaft so that a cross-sectional area of the air flow path increases toward the downstream end of the diffuser part, and the diffuser angle (θ) with respect to the axis of the rotation of the rotation shaft of the fan varies along a circumferential direction of the inner circumferential surface of the diffuser part When an inclination angle between an inclination of the diffuser part and a rotation shaft of the fan is represented as a diffuser angle (θ), a diffuser angle positioned at a side at which an air flow rate is great may be provided to be greater than a diffuser angle positioned at a side in which an air flow rate is small.

The plurality of noise prevention blades may be disposed to be spaced apart from each other in a radial shape around the rotation shaft of the fan, and outer circumferential ends of the plurality of noise prevention blades may be supported by an inside of the diffuser part.

The plurality of noise prevention blades may be formed to have an arc-shaped surface and provided to have convex surfaces facing the fan.

The molded blade part may be provided so that a boundary surface of a lower end of the molded blade part is provided along the convex surfaces of the plurality of noise prevention blades.

Another aspect of the present disclosure provides a blower including a fan, a diffuser part provided so that an area of a flow path is increased from a discharging surface through which the fan discharges air toward a downstream end, and a molded blade part including a hub provided in a cylindrical shape and having a hollow around a rotation shaft of the fan and a plurality of noise prevention blades provided to be extended from an outer circumferential surface of the hub toward an inclined surface of the diffuser part, wherein the plurality of noise prevention blades are disposed to be spaced apart from each other in a radial shape around the hub, and outer circumferential ends of the plurality of noise prevention blades are provided to be extended from the hub to the inclined surface of the diffuser part in an arc shape so that the outer circumferential ends of the plurality of noise prevention blades are supported by the inclined surface of the diffuser part.

An inclination angle of the diffuser part may vary along a circumferential direction of the diffuser part with respect to the rotation shaft of the fan, and a distance between an outer circumferential end of the hub and the inclined surface of the diffuser part may proportionally vary according to the varying inclination angle of the diffuser part.

That is, the blower according to an embodiment of the present disclosure is a blower provided with the bell mouth part disposed at the outside of a propeller fan in a diameter direction and having a lateral cross-section in a circular shape, and the diffuser part installed in series at a downstream end of the bell mouth part, an inclined surface facing the outside in the diameter direction as at least a part of the inner circumferential surface of the diffuser part faces a downstream side, and simultaneously an opening of a downstream end of the diffuser part has a shape different from the circular shape.

Accordingly, since a flow path enlargement rate of the diffuser part varies according to positions by, for instance, setting the flow path enlargement rate according to a flow rate of each position of non-uniform air current having a suction flow rate deviation (a distribution) due to the position, loss of the diffuser part is may be suppressed, and a pressure restoring effect may be maximized.

As a result, blowing efficiency may be significantly increased and blowing noise may be decreased due to a flow speed decreasing effect which is an evidence of the pressure restoring effect.

An opening of a downstream end of the diffuser part, which is easy to manufacture and practical may have an oval shape (a capsule shape) or polygonal shape of which corners are rounded.

When an angle formed by the inclined surface and a rotation shaft line of the fan is represented as a diffuser angle and the diffuser angle is provided to generally vary in a circumferential direction, turbulence generation due to drastic increasing an area of a flow path of the diffuser part is suppressed as much as possible, a pressure restoring effect may be obtained, and thus efficiency improvement and a noise decrease effect may more obviously be obtained.

As a specific aspect which suppresses the turbulence generation, when the diffuser angle is represented as $\theta$, the diffuser angle may vary in the range of $3° \leq \theta \leq 35°$.

To more obviously obtain the effect of the embodiment of the present disclosure, it is preferable that the diffuser angle of a portion at which an air flow rate which passes through the propeller fan is great be greater than that of a portion at which the air flow rate which passes through the propeller fan is small.

To obtain high efficiency and low noise while suppressing loss due to collision or interference of air currents discharged from the blowers at the blowers and other blowers disposed adjacent to the blowers, it is preferable that the diffuser angle $\theta$ of a portion adjacent to the other blowers be set in the range of $3° \leq \theta \leq 7°$ when the diffuser angle is represented as $\theta$.

Meanwhile, when the bell mouth part is disposed to be spaced a predetermined distance from the outer circumferential end of the propeller fan, the diffuser part is installed at the downstream side of the bell mouth part, in which an area of a flow path is increased from an upstream side to a downstream side with an enlargement rate greater than an area enlargement rate of a flow path at the downstream end of the bell mouth part, and the stator part includes the plurality of noise prevention blades and disposed in the diffuser part, the diffuser part is formed at the downstream side of the bell mouth part, a tip clearance between the propeller fan and the bell mouth is kept to a necessary minimum, and the area enlargement rate of the flow path required for pressure restoring at the diffuser part may be obtained. Meanwhile, since the stator part is disposed in the diffuser part, the dynamic pressure of a vortex may be collected from the propeller fan compared with a conventional case. In addition, the blower according to an embodiment of the present disclosure may further improve blowing efficiency due to a synergistic effect.

In addition, since the diffuser part has an enlarged magnified flow path shape and the stator part is installed therein, the vortex may be introduced into the stator part from the propeller fan in a state in which an average speed of the vortex is sufficiently lowered, and thus a noise level generated from the noise prevention blades may be lowered.

In addition, since there is no need for the diffuser part to consider a tip clearance for the propeller fan unlike the bell mouth part, and the diffuser part is installed at a downstream of the bell mouth part and the stator part is disposed in the diffuser part, blowing efficiency may be further improved due to a synergistic effect with the diffuser part and the stator part. In addition, in the above-described structure, the diffuser part has an oval shape as seen from a shaft, a direction or length of span of at least a part of the noise prevention blades of the stator part may be different, a noise level which is increased by noise generated from the noise prevention blades reaching a peak point and overlapping each other may be prevented, and thus an overall noise level may be decreased.

Further specifically, it is preferable that the downstream end of the diffuser part be formed in an oval shape as seen from the shaft, the plurality of noise prevention blades be disposed in a radial shape from the center as seen from the shaft, and an outer circumferential end be in contact with an inner circumferential surface of the diffuser part. Accordingly, the diffuser part may have a suitable shape for restoring pressure, and a length or shape along a span direction of the noise prevention members constituting the stator part may not be the same, and thus a noise peak of a blade passing frequency (BPF) may be suppressed.

To obtain a specific shape for suppressing fluid separation due to a reverse pressure gradient at the diffuser part and easily obtaining a static pressure raising effect due to the diffuser part, it is preferable that a divergence angle $\alpha$ which is an angle formed by an upstream end of the diffuser part with respect to a virtual line extending from the downstream end of the diffuser part toward the shaft as seen from the longitudinal cross-section be in the range of $3° \leq \alpha \leq 35°$, however, when there is the noise prevention blade, the divergence angle a may be set to in the range of $0° < \alpha < 18°$. It may be more preferable that the divergence angle $\alpha$ be set to 9°. In addition, the diffuser angle $\theta$ may be an angle of any portion of the diffuser part, the divergence angle $\alpha$ may be an angle of the upstream end of the diffuser part, and $\theta$ and a may be the same.

To suppress a drastic change in a curvature at the inner circumferential surface of the diffuser part due to the divergence angles at a major axis and a minor axis of the diffuser part being greatly different, easily rectify a flow at the diffuser part, and improve a static pressure raising effect, it is preferable to be set such that $0.75 < D/W < 1$ when a length of the major axis of an oval shape of the downstream end of the diffuser part seen from the shaft is represented as W, and a length of the minor axis is represented as D.

To uniformly collect a dynamic pressure of a vortex from the propeller fan, and improve blowing efficiency, it is preferable that the central point of a circular or polygonal shape of the downstream end of the diffuser part or an intersection point of the major axis and the minor axis of an oval shape be exist on a rotation shaft line of the propeller fan as seen from the shaft.

To decrease a weight applied to the noise prevention blade and decrease necessary strength so that a thickness of the noise prevention blade is maintained and material cost is decreased, it is preferable that the stator part include the hub in a substantially hollow cylindrical shape in which the inner circumferential end of the noise prevention blade is connected to the outer circumferential surface and the hub include a reinforcement rib structure in a radial shape.

For example, to prevent breaking a rotational balance of the propeller fan due to snow being accumulated on a central portion of the propeller fan in the bell mouth part and being in contact with the inner circumferential surface of the bell mouth part to be destroyed, it is preferable that a cover member which is installed to cover the downstream side of the hub and has a cone-shaped surface or dome-shaped curved surface be further provided. Accordingly, since the cover member has the curved surface, snow is not accumulated on the hub, and the noise prevention blades of the stator part may also be prevented from being damaged due to a weight of snow.

It is preferable that the cover member be installed to be detachable from the hub in an area where it hardly snows so that a manufacturing cost is decreased by omitting the cover member.

To mold the diffuser part having a lateral cross-section of the downstream side in an oval shape, dispose the stator part in the diffuser part, and efficiently mold an even complex shape for improving blowing efficiency using resin injection molding, it is preferable to provide a container-shaped molded object in which the bell mouth part and the diffuser part are integrally molded and a molded blade part in which at least the stator part are molded.

According to the outdoor unit of the air conditioner using the blower according to an embodiment of the present disclosure, blowing efficiency may be significantly improved and fluid noise may also be reduced to be suitable to heat exchangers installed in a plurality of parallel rows.

As described above, a blower according to an embodiment of the present disclosure can significantly improve blowing efficiency as well as reduce blowing noise.

BRIEF DESCRIPTION OF THE DRAWINGS

[FIG. 1 is]

[FIG. 2 is]

[FIG. 3 is]

[FIG. 4 is a schematic view]

DESCRIPTION OF EMBODIMENTS

One embodiment of the present disclosure will be described with reference to accompanying drawings.

First Embodiment

A blower 7 according to the present embodiment is a type of axial fan used for an outdoor unit 600 (hereinafter, simply referred to as the outdoor unit 600) for an air conditioner.

Figure 1A:
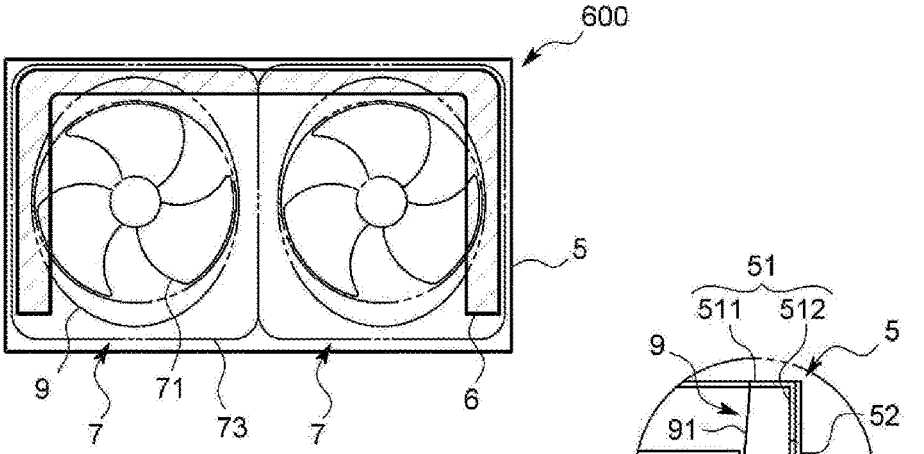
*FIG. 1A and FIG. 1B are* front and plan schematic views illustrating an inside of a blower and an outdoor unit for an air conditioner according to a first embodiment of the present disclosure.
Figure 1B:
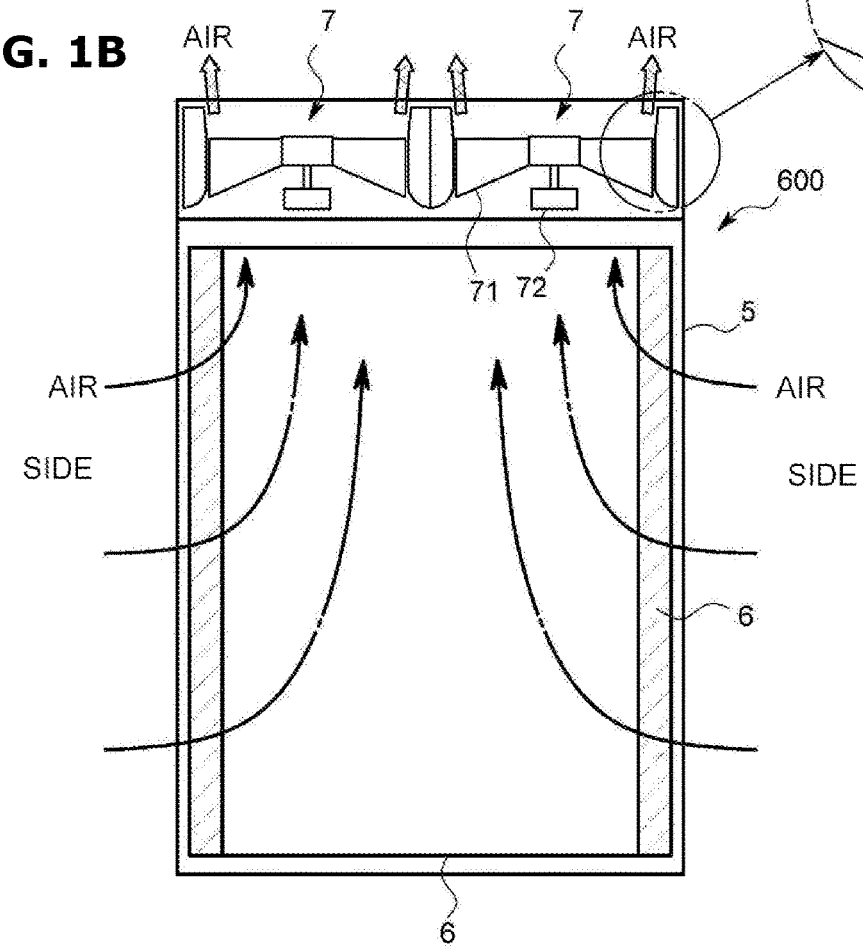
Figure 2A:
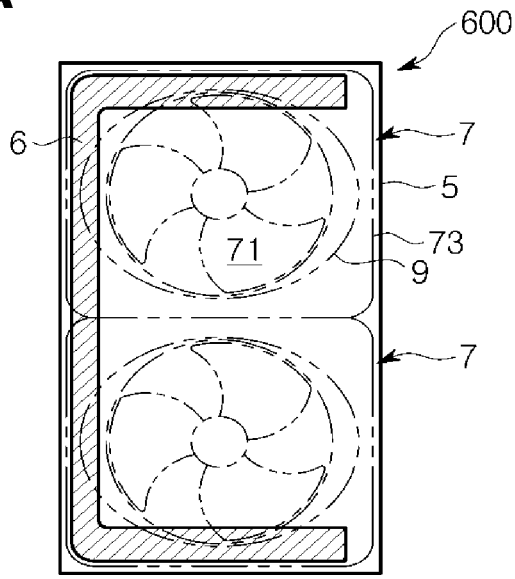
*FIG. 2A and FIG. 2B are* side and plan schematic views illustrating the inside of the blower and the outdoor unit for the air conditioner according to the first embodiment of the present disclosure.
Figure 2B:
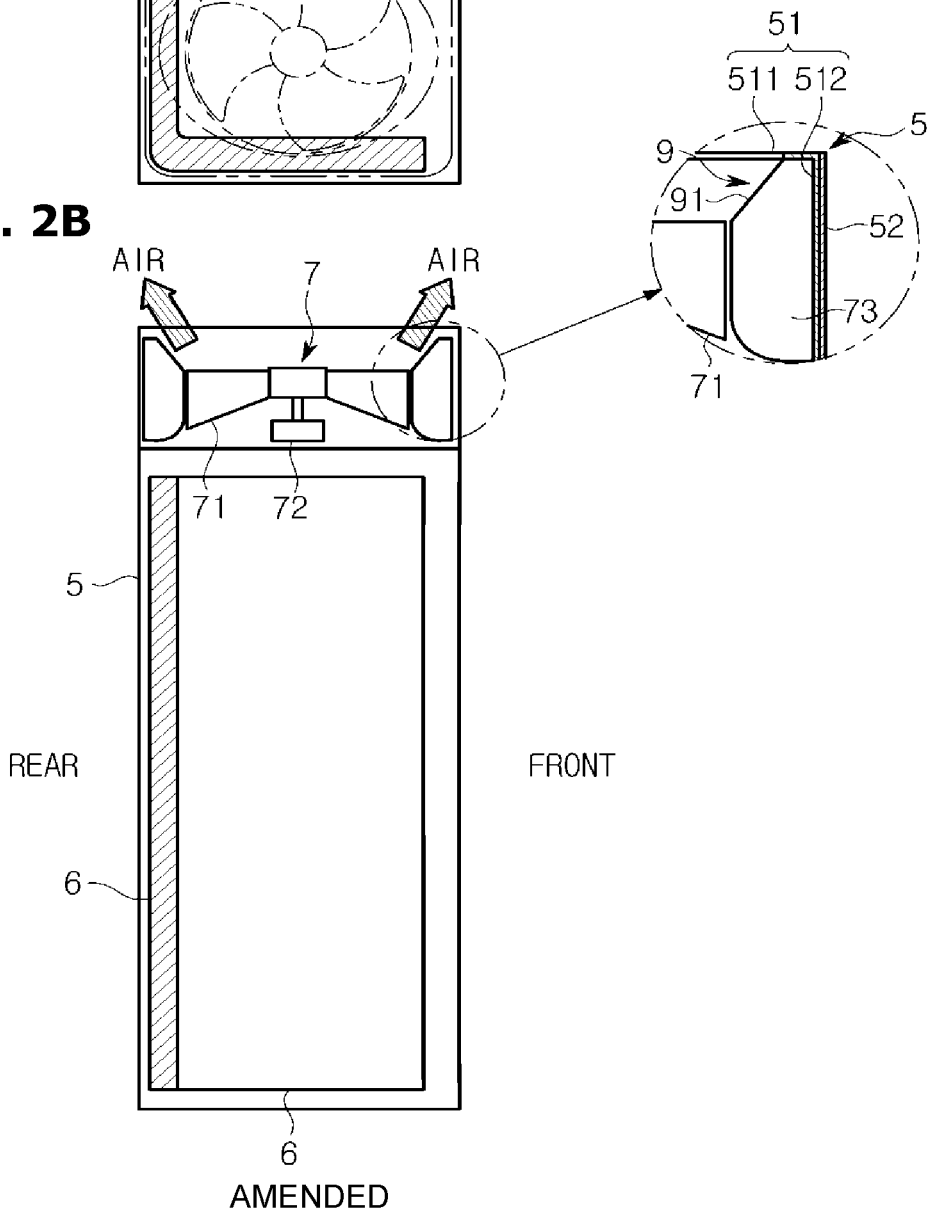

As illustrated in FIGS. 1 and 2, the outdoor unit 600 includes a casing 5 which is formed with a bottom plate (not shown) and side perimeter plates 52 and 51 in a substantially rectangular parallelepiped shape extending vertically, a plurality of heat exchangers 6 disposed at side and rear surfaces of the casing 5, and a plurality of (here, two) blowers 100 disposed adjacent to a top surface of the casing 5. In addition, the outdoor unit 600 has, so called, a vertical upright type in which air is introduced from a side surface of the casing 5 into an inside thereof by a vortex generated by the blower 100, comes into contact with the heat exchanger 6, and is discharged upward. In addition, the casing 5 accommodates various electric units (not shown) besides the heat exchanger 6.

Hereinafter, the blower 7 will be specifically described.

Figure 3A:
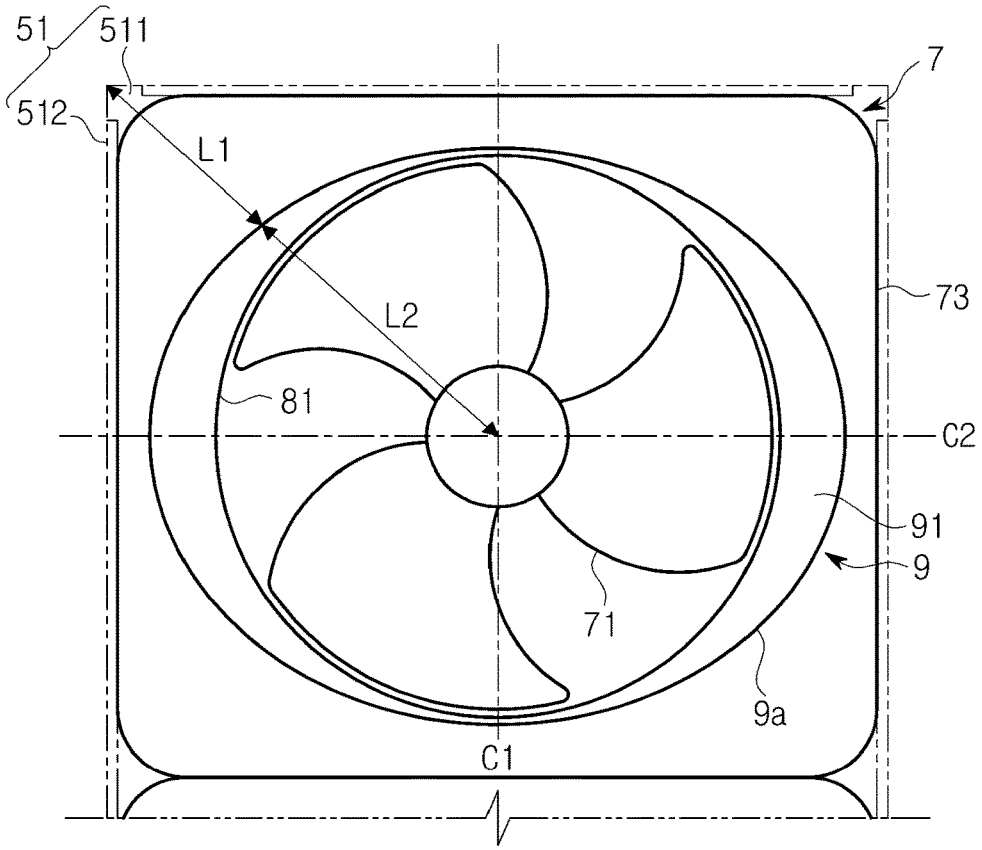
*FIG. 3A and FIG. 3B are* plan and front schematic views illustrating the blower according to the first embodiment.
Figure 3B:
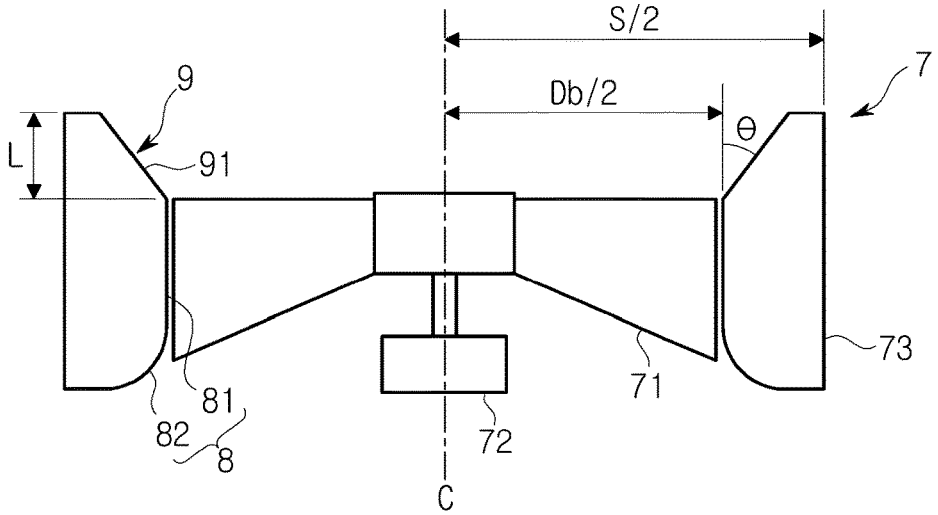

As illustrated in [FIG. 3] *FIG. 3B* and the like, the blower 7 includes a propeller fan 71, a motor 72 which drives and rotates the propeller fan 71, and a container-shaped molded object 73 which is disposed around the propeller fan 71 and has a container shape.

The container-shaped molded object 73 has an edge having a rectangular (including a square) outline as seen from an axis of rotation C of the propeller fan 71, and simultaneously is an integrally molded object formed by forming a through hole along a direction of the axis of rotation C, and a bell mouth part 8 and a diffuser part 9 are formed on an inner circumferential surface of the through hole. In addition, here, the container-shaped molded object 73 is disposed at an upper portion in the casing 5.

The bell mouth part 8 includes a bell mouth duct 81 which is installed having a tiny gap at a further outer side than an outer circumferential end of the propeller fan 71 in an inner circumferential surface of the container-shaped molded object 73 and has a substantially circular container-like shape, and an opening (a bell mouth) 82, which is installed to be connected to an upstream side of the bell mouth duct 81, and has a horn shape.

The diffuser part 9 is formed at the inner circumferential surface which continues from or extends from a downstream end of the bell mouth part 8 toward a side in which a upstream is generated in the inner circumferential surface of the container-shaped molded object 73, and, here, is an inclined surface 91 which is inclined toward the outside in a direction of a diameter such that a front surface of the inner circumferential surface faces a downstream side thereof.

In addition, when an angle formed between the inclined surface 91 and the axis of rotation C is defined as a diffuser angle θ, as the diffuser angle θ is provided to be smoothly changed in a circumference direction, the downstream end opening 9a in the diffuser part 9 has a shape different from a substantially circular shape, for instance, an oval shape, so that a width of the downstream end opening 9a through which air flows from an outlet of the bell mouth duct 81 as seen from the axis of rotation C changes according to location.

Accordingly, the inclined surface 91 in which the width is minimized, that is, the diffuser angle θ is minimized, is the inclined surface 91 positioned on a minor axis C1 of the downstream end opening 9a having an oval shape as seen from the axis of rotation C. Here, the diffuser angle θ is set to 3°. In addition, a direction of the minor axis C1 matches along a shorter side at an outer edge outline of the container-shaped molded object 73 which has a rectangular shape, and simultaneously a plurality of (two) blowers 7 are installed along the minor axis C1 direction, in other words, longer side surfaces of the container-shaped molded objects 73 are adjacently disposed with each other.

Meanwhile, an inclined surface, in which the diffuser angle θ is maximized, is the inclined surface 91 positioned on a major axis C2 of the downstream end opening 9a as seen from the axis of rotation C. Here the diffuser angle θ is set to 35°.

In addition, an inner diameter value of a downstream end of the bell mouth duct 81 is defined as Db, a height value of the diffuser part 9 along the direction of the axis of rotation C is defined as L, an edge value of the container-shaped molded object (a width or a length as seen from the axis of rotation) is defined as S, and Db, L, and S are set to satisfy the following equation (1).

$$S/2=C(L\times\tan(\theta)+Db/2) \quad (1)$$

Here, C is a coefficient in the range of $1.03\leq C\leq 1.5$, and more preferably in the range of $1.06\leq C\leq 1.12$.

According to equation (1), the strength of the container-shaped molded object 73 is secured, an installation space may be maximally used, influence of an adjacent blower 7 is significantly reduced, noise due to maximizing a diameter of the propeller fan may be reduced, etc.

Meanwhile, as illustrated in [FIG. 3] *FIGS. 3A and 3B* which [is an] *are* enlarged [view] *views* of FIGS. [1 and 2] *1A and 2A*, a top plate 51 (Hereinafter, referred to as a top panel 51) of the casing 5 is disposed at a top surface (a cross-section of a side of the diffuser part) of the container-shaped molded object 73 to be in contact therewith. The top panel 51 is a metal plate member provided with a surface plate part 511 having an opening approximately matching an outlet opening of the diffuser part 9 and a bent part 512 bent downward from an edge of the surface plate part 511, and the bent part 512 is screwed to a side perimeter plate 52 of the casing 5.

In addition, as illustrated in [FIG. 3] *FIG. 3A*, in the present embodiment, a virtual line is drawn from the center of rotation of the propeller fan 71 to a corner of the top panel 51 as seen from the axis of rotation C, when the length of the virtual line (that is, a distance from the center of rotation of the propeller fan 71 to the corner of the top panel 51) is defined as L1+L2, and a distance from the center of the propeller fan 71 to an outer edge of the outlet of the diffuser part 9 on the virtual line is defined as L2, and also when $D_{ratio}=L2/(L1+L2)$, equation (2) below is satisfied.

$$0.6\leq D_{ratio}\leq 0.95 \quad (2)$$

Hereinafter, an operation and an effect of the outdoor unit 600 configured as described above will be described.

As illustrated in FIGS. 1 and 2, although the heat exchanger 6 is not disposed in the front of the casing 5, the heat exchanger 6 is disposed at a side of the casing 5, and thus more air is suctioned when the blower 7 is operated. In addition, since electric elements and the like disposed inside the casing 5 also have air resistance, in the present embodiment, a larger amount of air is introduced through an inlet (the bell mouth 82) of the blower 7 from front and rear portions of the bell mouth 82 where the number of elements which can serve as air resistance are few. As a result, in the diffuser part 9, an air flow rate is maximized in the front and rear portions and the air flow rate is minimized in both side portions.

As described above, since a diffuser angle θ at the front and rear portions of the diffuser part 9 is set to as large a value as possible in the range in which a turbulent current does not occur (here, a maximum of 35°) even though an air flow rate increases in the front and rear portions of the diffuser part 9, a viscosity loss due to the turbulent current is suppressed and thus a pressure restoring effect at this portion may be maximized.

In addition, when the diffuser angles θ at the front and rear portions are the same while the air flow rate at both side portions of the diffuser part 9 is decreased, because the diffuser angle θ enlarges such that the air flow becomes unstable and a loss occurs.

In contrast, according to the present embodiment, since the diffuser angle θ at this portion is set to a small value (a minimum of 3°), the above-described unstable air flow may be suppressed and a pressure restoring effect due to the diffuser part 9 at this portion may also be maximized.

That is, in the diffuser part 9 according to the present embodiment, since a loss due to an unstable air current such as a dispersion of the suction flow rate is suppressed as much as possible, a pressure restoring effect is maximized, and a blowing efficiency may be dramatically increased.

In addition, since the maximizing of the pressure restoring effect denotes that a flow rate in the diffuser part 9 is decreased, a blowing noise reduction may also be obtained.

In addition, in the present embodiment, since the blowers 7 are installed in series and the diffuser angles θ at adjacent portions are set to be small values, an angle of an air current discharged therefrom becomes approximately vertical, Interference of the air currents exhausted from both of the blower 7 may be suppressed, and thus low noise blowing at high efficiency may be possible.

Because the above-described $D_{ratio}$ is set to 0.9 or less, a bending process of the top panel 51 is certainly possible at a position at which the outlet opening of the diffuser part 9 is closest to an edge of a top panel surface plate part 511, and thus the bent part 512 may be formed. Meanwhile, since $D_{ratio}$ is set to 0.6 or more, an equalization of a change ratio of the outlet opening of the diffuser part outlet (a change ratio of the diffuser angle θ along a circumferential direction) of the diffuser part defined by $D_{ratio}$, an equalization of a flow change by reducing the change and improvement of noise performance may be obtained. In addition, a configuration related to this may also be applied to the top panel 51 having a rectangular shape as seen from the axis of rotation C.

Next, a modified example of the first embodiment will be described.

Figure 4A:
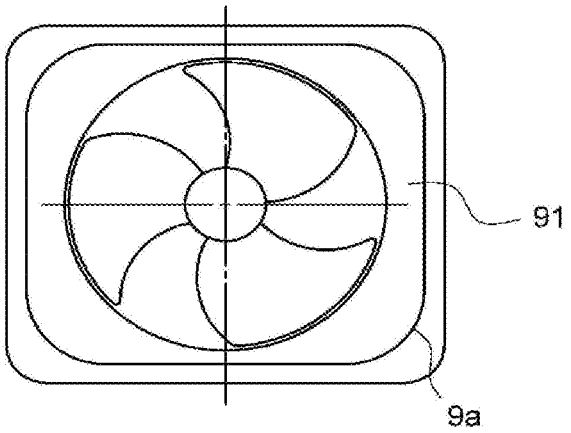
*FIG. 4A, FIG. 4B, and FIG. 4C are schematic views* illustrating a modified example of the blower according to the first embodiment.
Figure 4B:
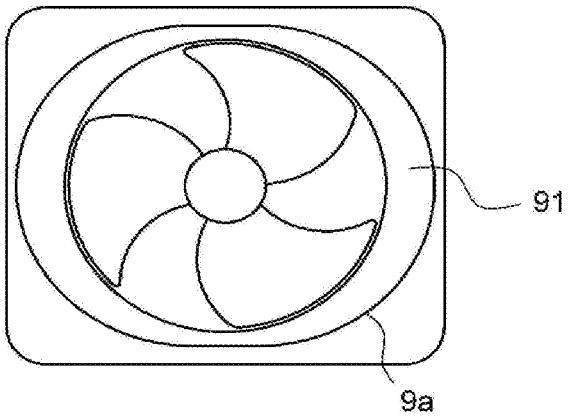

First, it is preferable that a diffuser angle be changed and an additional shape different from a circle be formed according to a shape of a downstream end opening of the diffuser part or, for example, a distribution of a suction flow rate. Since the distribution of the suction flow rate depends on at least an arrangement of internal apparatuses, it is preferable that, for example, a diffuser angle of the inclined surface positioned at a position at which the bell mouth parts are not vertically overlapped be set to be greater than the diffuser angle of the inclined surface positioned at a portion at which the internal apparatuses and the bell mouth part are vertically overlapped. Specifically, as illustrated in [FIG. 4] *FIGS. 4A, 4B, and 4C*, a downstream end opening 9a of the diffuser part may have a shape such as a rectangular shape with rounded corners (see FIG. 4A), an oval shape (see FIG. 4B) or the like. In addition, for instance, when the downstream end opening 9a has the rectangular shape with rounded corners, a case in which the diffuser angle θ is maximized at the corners may occur. As described above, the air flow rate does not need to be a maximum at a position at which the diffuser angle θ is the maximum.

Figure 4C:
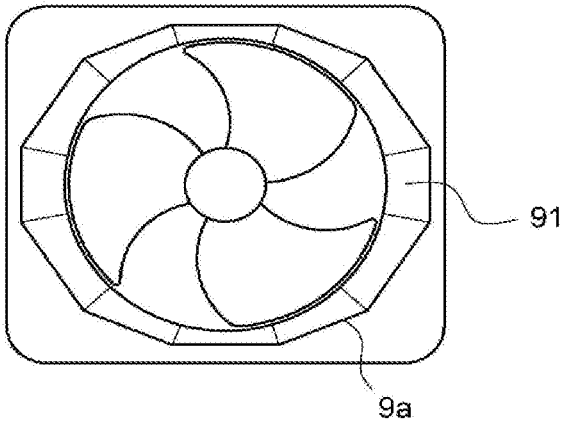

In the embodiment, although the diffuser angle θ smoothly and continuously varies along the circumferential direction so as to suppress an occurrence of turbulence and the like as much as possible, the diffuser angle θ may also vary discontinuously. In this case, as illustrated in FIG. 4C, the downstream end opening 9a has a shape with angles at discontinuous positions.

Although, the diffuser angle θ is set to 35° as a maximum and 3° as a minimum in the embodiment, it is not limited thereto. For example, the maximum value may also be less than 35°, and the minimum value may also be more than 3°. Particularly, the diffuser angle θ of a side of an adjacent blower is preferably in the range of $3° \leq \theta \leq 7°$.

The diffuser angle θ may be formed to be smoothly changed step-by-step or continuously toward a downstream side as seen from a cross-section parallel to an axis of rotation. In this case, an enlargement rate of the flow path of the diffuser part increases toward the downstream side.

Figure 5:
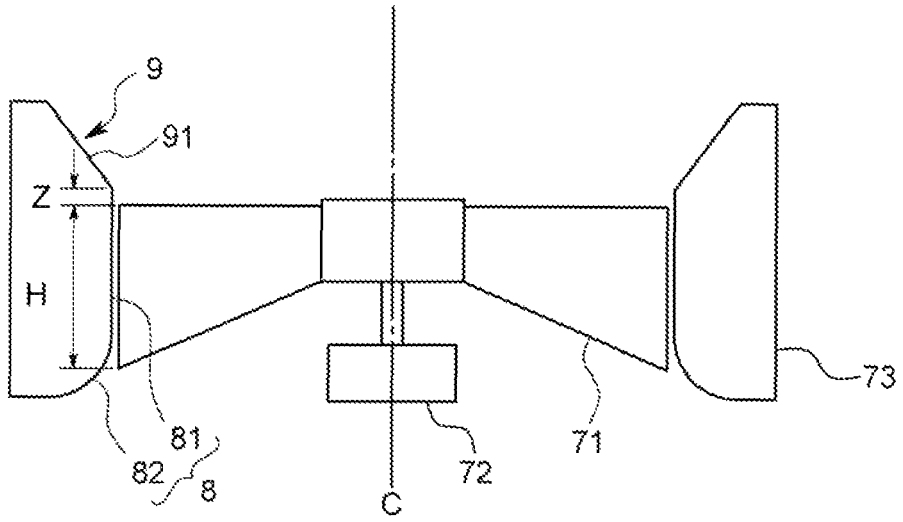
FIG. 5 is a plan schematic view illustrating the modified example of the blower according to the first embodiment.

In the embodiment, although a height of the downstream end of the propeller fan 71 and a height of an upstream end of the diffuser part 9 are matched when seen from a direction perpendicular to the axis of rotation C as illustrated in [FIG. 3] *FIG. 3B*, this may also be changed. Specifically, as illustrated in FIG. 5, when H denotes a value of an outer circumferential end of the propeller fan 71 along a shaft, and Z denotes a distance between the upstream end of the diffuser part 9 and the downstream end of the propeller fan 71 along the shaft, it is preferable that Z be in the range of H±20%. When set as described above, since a vortex discharged from the propeller fan smoothly decreases in speed and spreads along the inclined surface 91 of the diffuser part 9, a larger pressure restoring effect may be obtained.

A shape of the bell mouth duct is not limited to a cylindrical shape, and when the outer circumferential end of the propeller fan does not have a vertical shape, for example, the shape may be a partial cone shape corresponding thereto, or a noise prevention blade may be installed at the diffuser part. Such an example will be described in detail in a second embodiment.

The blower may not be limited to the outdoor unit, and may be used for various uses. For example, the blower may also be used for a blower having a ventilation fan or a blower connected to a duct for ventilation.

In addition, the blower is not limited to air and may obtain the same effect by being applied to a gas.

Second Embodiment

Figure 6:
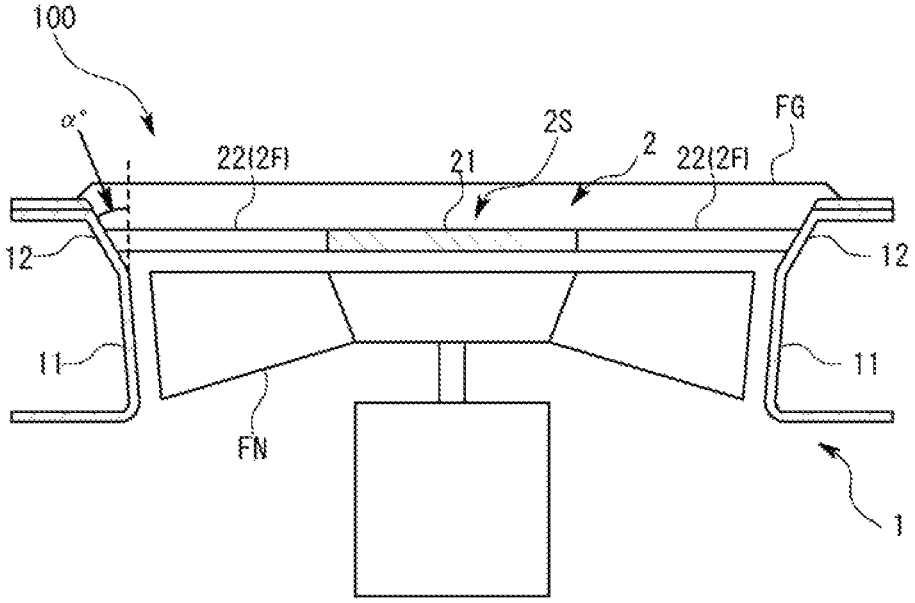
FIG. 6 is a schematic view illustrating a blower according to a second embodiment of the present disclosure.
Figure 9:
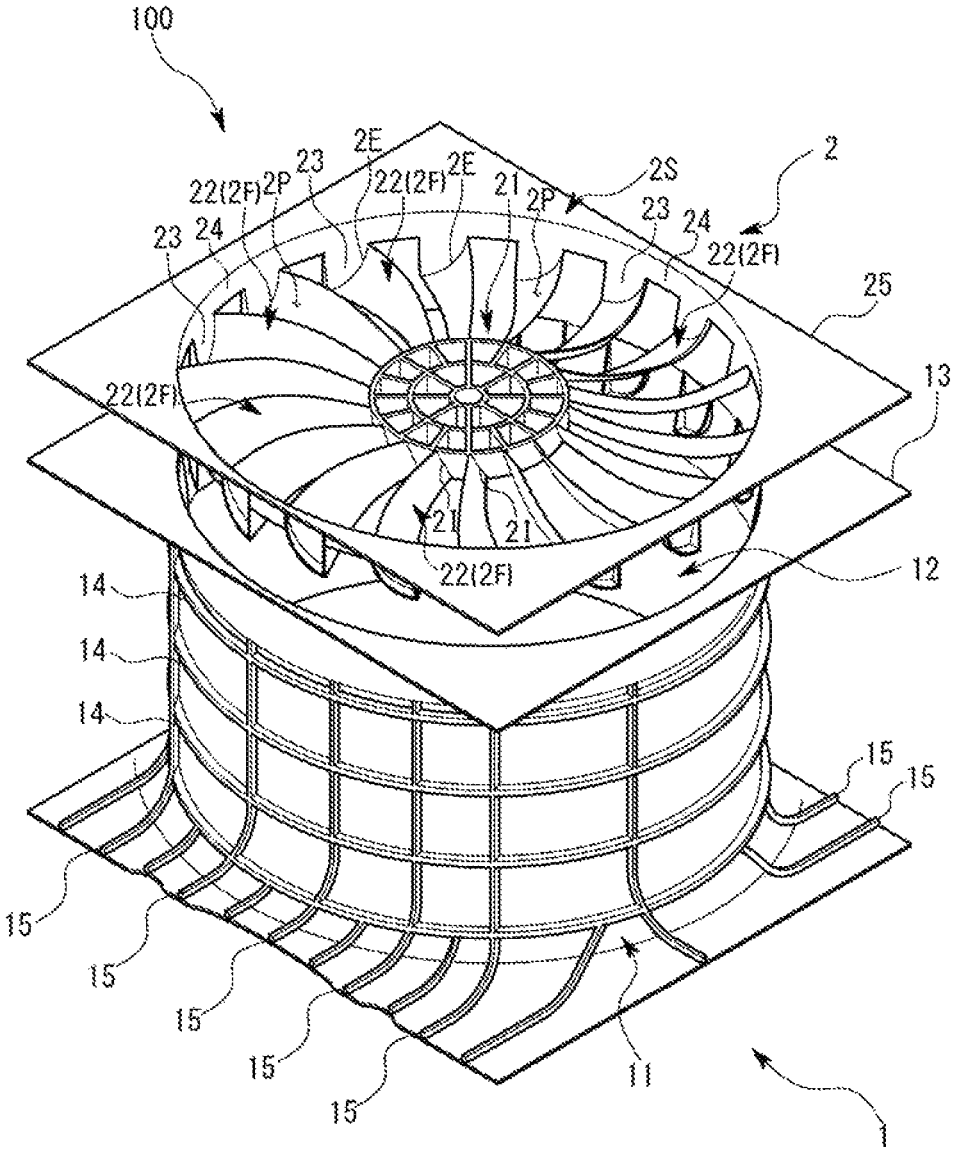
FIG. 9 is an exploded schematic view illustrating the blower according to the second embodiment.

Next, a second embodiment of the present disclosure will be described. A blower 100 according to the present embodiment is formed by a resin injection mold, as illustrated in FIGS. 6 and 9, and includes a container-shaped molded object 1 formed in a substantially cylindrical shape and a molded blade part 2 in which a stator part 2F provided with a plurality of noise prevention blades 22 having a substantially flat rectangular parallelepiped shape is formed at a central circular portion. As illustrated in FIG. 6, the molded blade part 2 is assembled in the container-shaped molded object 1, and then the stator part 2F may be disposed at a predetermined position in the container-shaped molded object 1. In addition, a fan guide FG is installed at a downstream side of the molded blade part 2 to cover the stator part 2F.

As illustrated in FIGS. 6 and 9, the container-shaped molded object 1 is integrally formed with a bell mouth part 11 which is disposed to be spaced a predetermined distance from an outer circumferential end of the propeller fan FN in a radius direction, and a diffuser part 12 which is installed at a downstream side of the bell mouth part 11 and wherein a flow path extends from an upstream side toward a downstream side.

As illustrated in FIG. 6, the bell mouth part 11 has portions having a circular lateral cross-section, and includes a bell mouth provided to have an open upstream side in a cone shape, and a bell mouth duct installed so that its diameter is increased from a portion facing an uppermost stream portion of the propeller fan FN. In addition, an inner circumferential surface of the bell mouth part 11 and an outer circumferential end of the propeller fan FN maintain constant tip clearance when seen from any radius directions.

Figure 7:
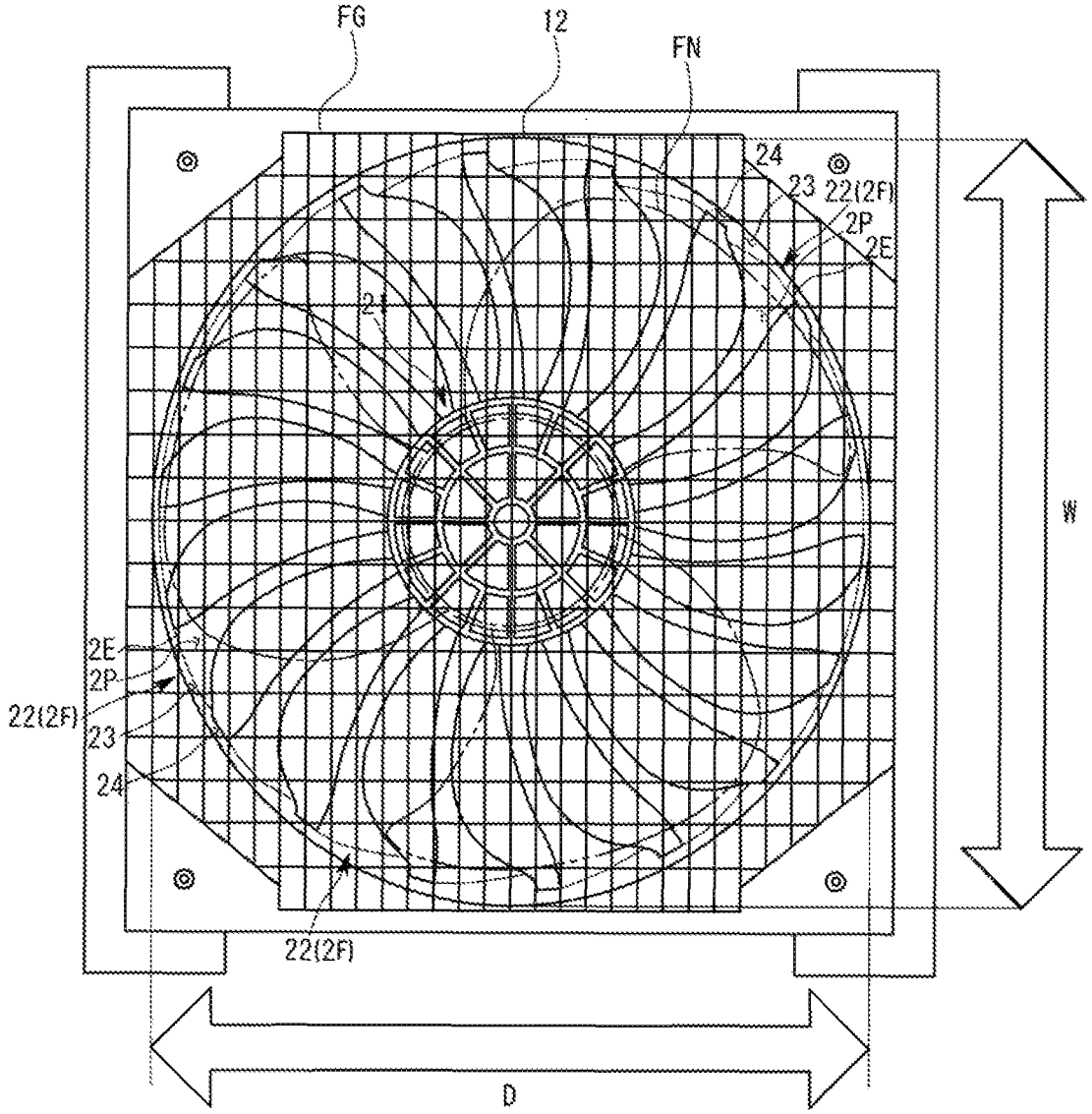
FIG. 7 is a top schematic view illustrating the blower according to the second embodiment.
Figure 8:
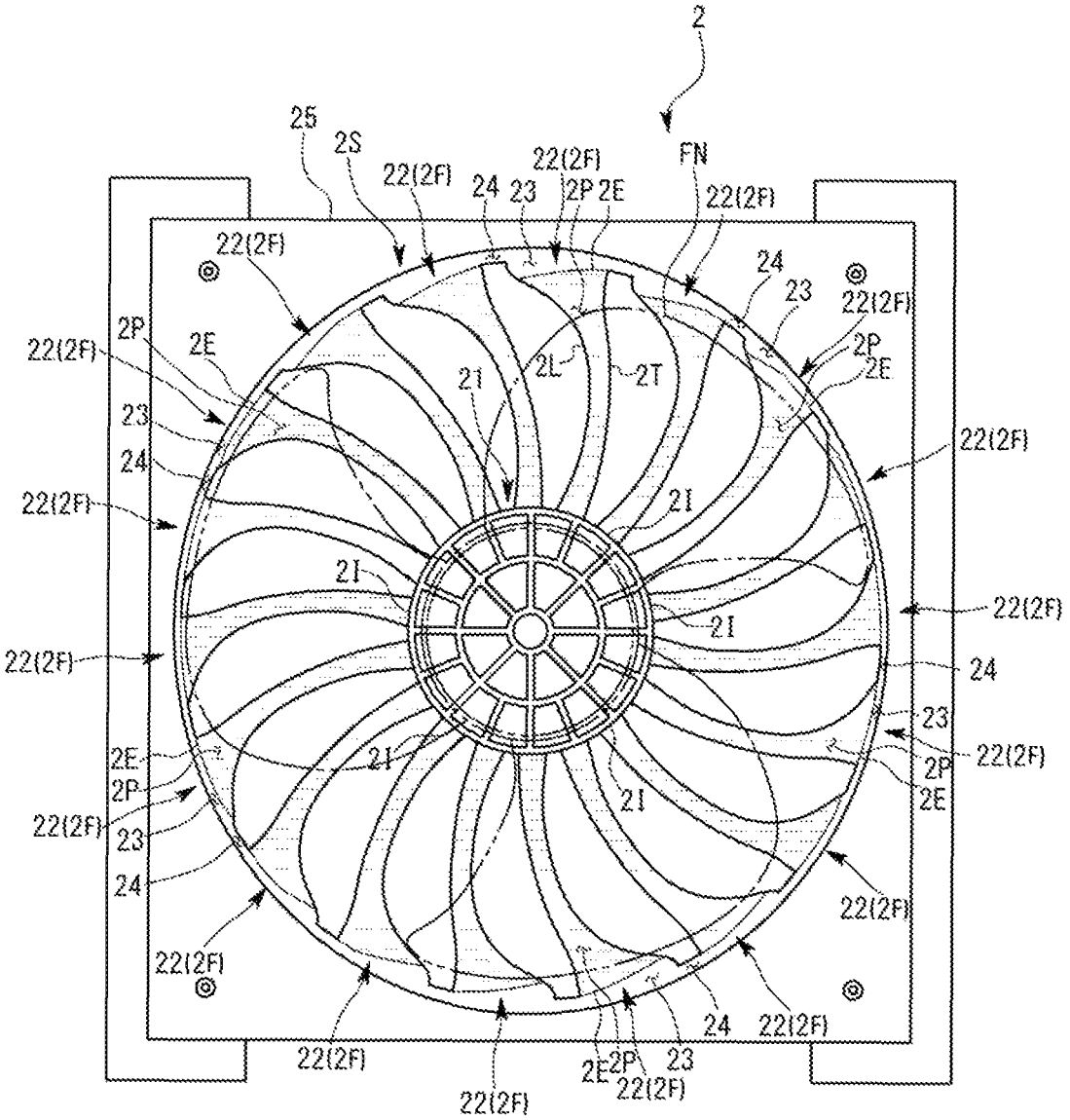
FIG. 8 is a top schematic view illustrating a state in which a fan guide according to the second embodiment is excluded.

As illustrated in FIG. 6, the diffuser part 12 is formed so that an upstream end connected to the bell mouth part 11 is formed to have a substantially circular lateral cross-section, and as illustrated FIGS. 7 and 8, is formed so that an opening end of a downstream side has an oval lateral cross-section. The diffuser part 12 is also formed to have a lateral cross-section between an upstream end and a downstream end, in which a lateral cross-sectional area increases from an upstream side toward a downstream side, and simultaneously, the upstream end and the downstream end are smoothly and continuously connected. In addition, in the container-shaped molded object 1, when seen from a shaft direction from the upstream side to the downstream side, an area enlargement rate of a flow path at an upstream side end of the diffuser part 12 is greater than that of a lower downstream side end of the bell mouth part 11, and as illustrated in FIG. 6, the diffuser part 12 is connected to the bell mouth part 11 in a bent state.

As illustrated in FIG. 7, a length of a downstream end of the diffuser part 12 along a major axis direction is defined as W and a length along a minor axis direction is defined as D, each length is set to satisfy $0.75<D/W<1$ in the present embodiment. According to the above-described setting, a large change in a curvature of an inner circumferential surface of the diffuser part 12 due to a difference between a divergence angle a of a major axis side of the diffuser part 12 and that of a divergence angle a of a minor axis side of the diffuser part 12 does not occur, and thus it is easy to rectify a fluid flow.

In addition, an intersection point of the major and minor axes of the diffuser part 12 and center of the stator part 2F is disposed on an axis of rotation of the propeller fan FN.

Figure 10:
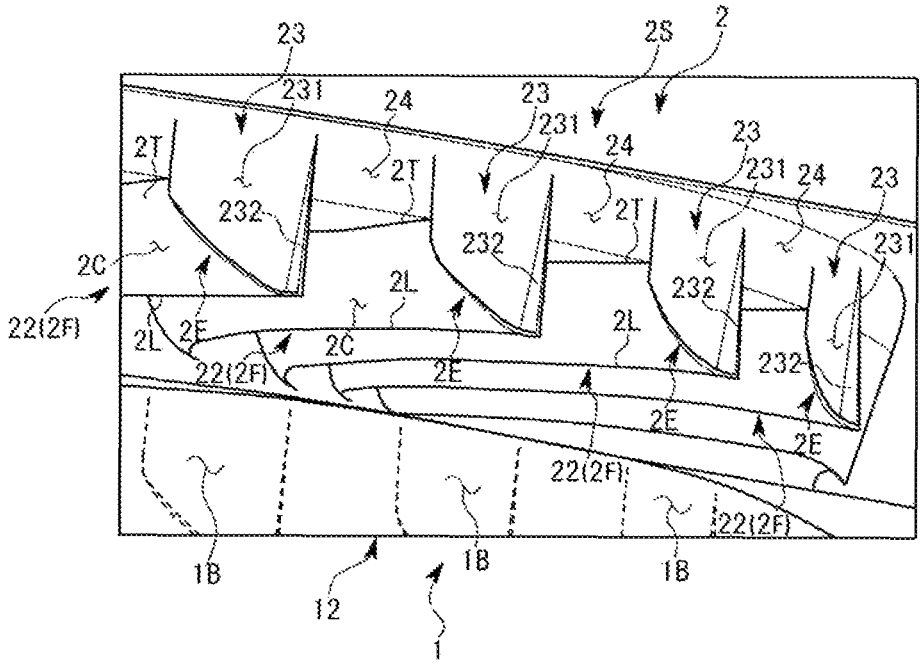
FIG. 10 is a schematic perspective view illustrating a vicinity of an outer circumferential end of a stator part according to the second embodiment.
Figure 10:
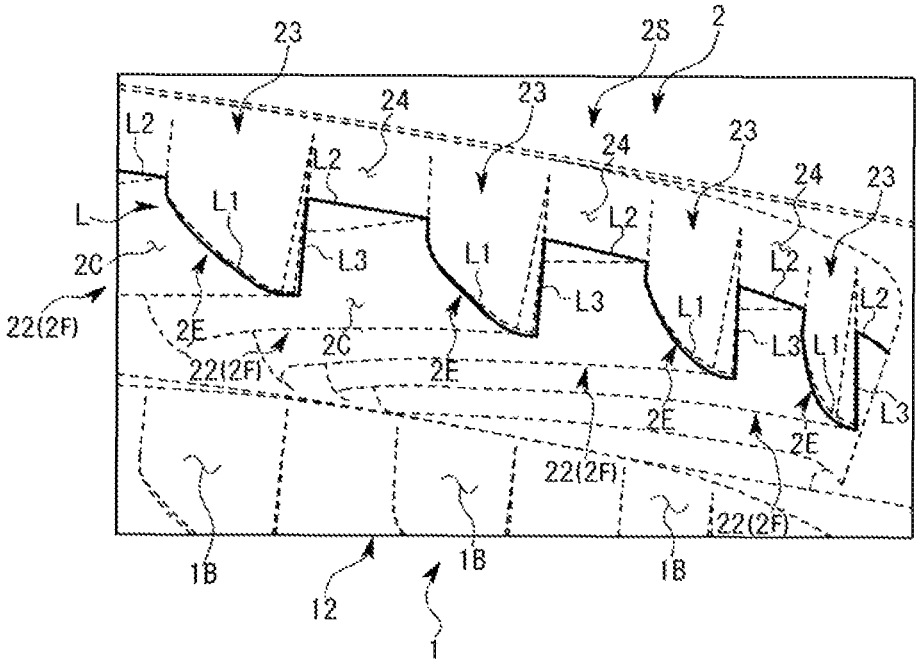

In addition, as illustrated in FIGS. 9 and 10, a downstream side end of the diffuser part 12 is formed to be in contact with an outer circumferential end 2E of the stator part 2F when the molded blade part 2 is assembled at the container-shaped molded object 1, and the stator part 2F is disposed and fixed to a flow path in the diffuser part 12 after assembly. In addition, a large seating part 13, which has a flat plate shape widened in a flat surface perpendicular to a shaft, is formed at the downstream end of the diffuser part 12, and the downstream end of the diffuser part 12 is provided to be in contact with an installation flat plate part 25 which is formed at the molded blade part 2 and which will be described later.

As illustrated in FIGS. 9 and 10, the above-described structure is formed so that a plurality of concave parts 1B having a shape substantially the same as that of each connection part 23 of the stator part 2F, which will be described later, are formed to be parallel to each other along a circumferential direction. The concave part 1B causes an internal surface of the diffuser part 12 to be concave along a radius direction, and at the same time, a bottom surface thereof to be parallel to the shaft direction. Accordingly, a depth of the concave part 1B becomes deeper from a downstream side to an upstream side.

Figure 11:
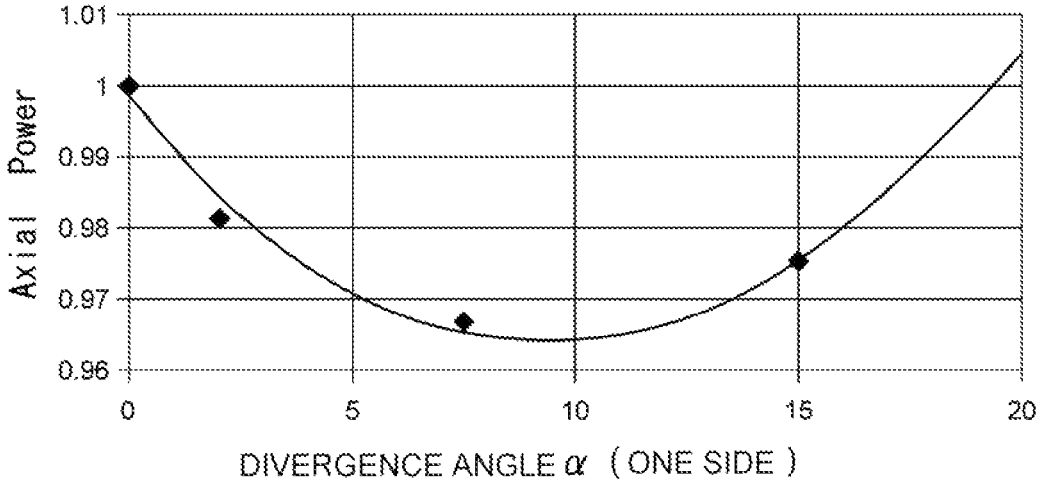
FIG. 11 is a schematic graph which shows a relation between a divergence angle and a static pressure rising effect according to the second embodiment.

Here, in the bell mouth part 11 and the diffuser part 12, when a radius increase rate at a position from the upstream side to the downstream side along the shaft direction (a major axis radius and a minor axis radius) is compared, the radial increase rate of the diffuser part 12 is set to be bigger. That is, when seen in a longitudinal cross-section in FIG. 6, a surface forming the upstream side end of the diffuser part 12 is inclined with respect to a surface forming a downstream side end of the bell mouth part 11 to form a predetermined angle. In other words, as illustrated in FIG. 6, when seen in the longitudinal cross-section, a divergence angle $\alpha$ at a corner formed by the inner circumferential surface of the diffuser part 12 with respect to a virtual line extending from a downstream end of the bell mouth part 11 in the shaft direction is set to be in the range of $0° < \alpha < 18°$, which is slightly different from that of the first embodiment. As illustrated in a simulation result in FIG. 11, as the divergence angle $\alpha$ is set to the above-described angle, fluid separation due to a reverse pressure gradient is suppressed at an inner peripheral surface of the diffuser part 12, and thus a static pressure rising effect may be easily obtained. It is also preferable that the angle $\alpha$ be in the range of $3° \leq \alpha \leq 35°$.

In addition, from the viewpoint of functions of the bell mouth part 11 and the diffuser part 12, the bell mouth part 11 is for improving a fluid pressure near the propeller fan FN, and the diffuser part 12 is for increasing a pressure of a vortex from the propeller fan FN.

As illustrated in an outer peripheral surface of the container-shaped molded object 1 in FIG. 9, vertical ribs 15 extending along the shaft direction and lateral ribs 14 extending in the circumferential direction are formed to increase strength of the container-shaped molded object. A protrusion direction of the vertical rib 15 does not face a radius direction with respect to the shaft, and the protrusion direction is the same for each half thereof. That is, the container-shaped molded object 1 is provided to be molded by a mold that is divided in two as a front and a rear in a radius direction thereof, and thus the vertical rib 15 is formed in a dividing direction of the mold for each half thereof.

Next, the molded blade part 2 will be described.

As illustrated in FIGS. 7 and 9, the molded blade part 2 includes a hub 21 formed at a central portion in a substantially flat cylindrical shape, a plurality of noise prevention blades 22 disposed at an outer peripheral surface of the hub 21 in an outer radial shape, the connection parts 23 extending from the outer circumferential end 2E of the noise prevention blade 22 to a downstream side in the shaft direction, link parts 24 which connect the connection parts 23 along the circumferential direction, and the installation flat plate part 25 in contact with the large seating part 13 having a flat plate shape. In addition, in FIG. 8, the noise prevention blade 22 is hatched to be seen easily even though it is not a cross-section.

As illustrated in FIGS. 8 and 9, the hub 21 includes three coaxial ring-shaped members each having a different diameter and a reinforcement rib structure which connects ring state members along a radial direction. That is, the hub 21 is formed in a hollow through which a fluid can pass, as well as formed to be capable of maintaining a predetermined strength. In addition, since the hub 21 is formed in the hollow, loads on inner circumferential ends of the plurality of noise prevention blades 22 is decreased, strength needed by the noise prevention blade 22 is decreased, and thus the thickness thereof may be formed as thinly as possible.

As illustrated in FIG. 8, the plurality of noise prevention blades 22 include the stator part 2F, an inner circumferential end 21 of the noise prevention blade 22 is connected to the outer peripheral surface of the hub 21, and the outer circumferential end 2E is formed to be in contact with an inner surface of the diffuser part 12. However, because the diffuser part 12, except for a connection part with the bell mouth part 11, is formed to have a lateral cross-section in an oval shape, shapes of the noise prevention blades 22 and lengths of strings of noise prevention blades are different from each other in a quarter of the oval. Accordingly, the connection part 23 also has a shape corresponding to a shape of the noise prevention blade 22.

Figure 12:
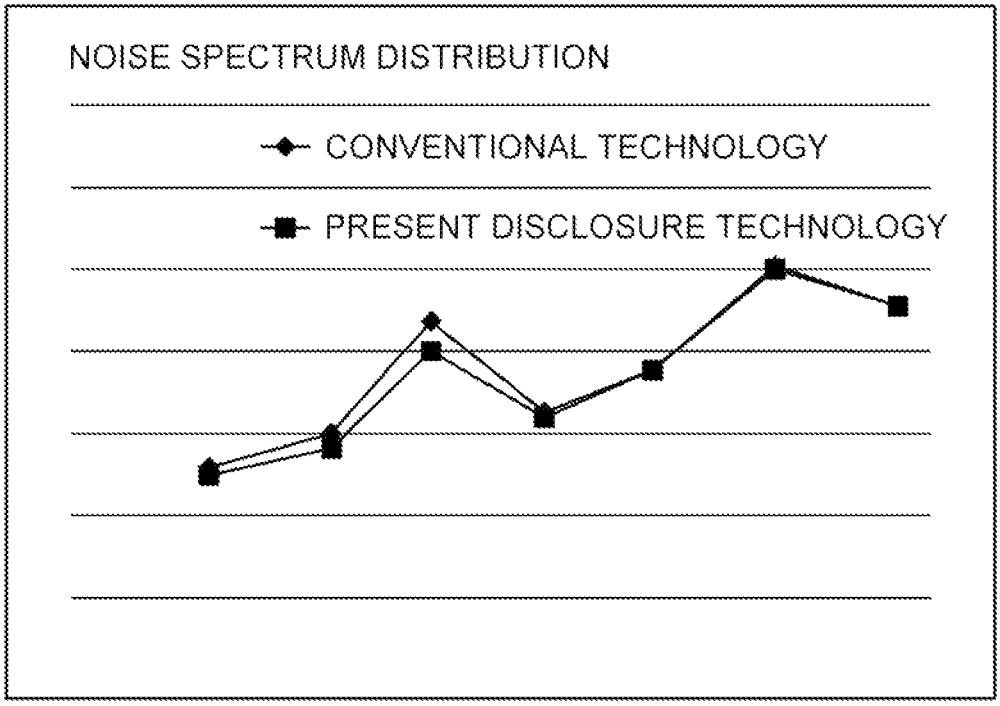
FIG. 12 is a spectrum distribution of noise according to the second embodiment.

As described above, since a length in a span direction or a shape of the noise prevention blade 22 is repeatedly changed every quarter when the noise prevention blades 22 are seen in turn from the circumferential direction in the stator part 2F, noise may be prevented from being generated in the noise prevention blade 22 with the same specific frequency. That is, by alternating frequencies having the highest peak in the noise prevention blades 22, a Blade Passage Frequency (BPF) noise level may be decreased. More specifically, as illustrated in a graph in FIG. 12, a blower 100 according to the present embodiment may decrease a noise level at each frequency, particularly low frequencies, when compared with a conventional technology.

In addition, as illustrated in FIG. 9, the noise prevention blade 22 is installed so that a convex surface 2C thereof faces an upstream side where the bell mouth part 11 and a fan motor exist, as well as a concave pressure surface 2P faces a downstream side where the downstream end of the diffuser part 12 exists. In addition, as illustrated in the top view of FIG. 8, predetermined gaps are defined between the adjacent noise prevention blades 22 so that leading edges 2L and following edges 2T do not overlap each other when seen from the shaft.

As illustrated in an enlarged perspective view of FIG. 10A, the connection part 23 includes a plate-shaped part 231 extending from an outer end of the noise prevention blade 22 toward the shaft, and an outer edge rib 232 protruding from an outer edge of the plate-shaped part 231 in the radius direction. The plate-shaped part 231 has an inner circumferential surface having a shape so that the inner circumferential surface of the plate-shaped part 231 matches an inner surface of the diffuser part 12 when the connection part 23 is engaged with the concave part 1B. In addition, the outer edge rib 232 is formed to have a height which increases from a downstream side to an upstream side.

As illustrated in FIG. 10A, the link part 24 has a partial ring state extending along a circumferential direction, and is formed to connect upstream side ends of the connection parts 23. That is, the upstream side end of the connection part 23 and the link part 24 are alternatively disposed along the circumferential direction and formed in a ring state as a whole.

Next, division lines L between the container-shaped molded object 1 and the molded blade part 2 of the blower 100 provided as described above will be described.

As illustrated with bold lines in FIG. 10A, each division line L of elements is formed to include at least a convex surface forming line L1 forming a convex surface 2C at the outer circumferential end 2E of the noise prevention blade 22. In the present embodiment, the division line L is defined by the convex surface forming line L1, a circumferential direction line L2 which defines a downstream end of the link part 24, and a shaft direction line L3 which is a downstream side of the outer edge rib 232 of the connection part 23 and extends from the convex surface forming line L1 to the circumferential direction line L2 along the shaft direction. In another words, as illustrated in FIG. 10B, the division line L between the container-shaped molded object 1 and the molded blade part 2 is formed in approximately a saw-toothed shape, and includes the convex surface forming line L1 forming the convex surface 2C at the outer circumferential end 2E of the noise prevention blade 22.

As described above, since the blower 100 according to the present embodiment has a complex structure in which the diffuser part 12 is formed at the downstream side of the bell mouth part 11 and the stator part 2F in which the shape of the noise prevention blade 22 is formed at an inner surface of the bell mouth part 11 is disposed in the diffuser part, a restoring pressure of fluid increases compared to a conventional technology, and thus the blowing efficiency may be significantly improved.

In addition, because the diffuser part 12 is installed at the downstream side of the bell mouth part 11, the downstream end of the diffuser part 12 is formed in the oval shape, and the noise prevention blade 22 is installed in the radial shape therein, first, speed of fluid which flows from the downstream end of the diffuser part 12 is decreased, and thus an entire noise level may be decreased. In addition, because lengths along the span direction or the shapes of the noise prevention blades are not the same and have a tiny difference between them and the vortex coming out from the propeller fan FN and the interference state of the noise prevention blade 22 are different from each other, noise intensively generated at a specific frequency may also be prevented. From that, blowing performance may be significantly improved and a noise level may also be decreased.

In addition, since the container-shaped molded object 1 is divided by the division line L, and the blower 100 includes the molded blade part 2, the noise prevention blades 22 of the diffuser part 12 and the stator part 2F are formed separately. Accordingly, the diffuser part 12 which has the complex shape for improving the blowing efficiency described above, has an enlarged flow path varying from the circular shape to the oval shape and a form in which the noise prevention blade 22 of the stator part 2F is formed up to the outer circumferential end 2E, and thus priority is given to such a complex structure while preventing manufacturability from being decreased.

More specifically, for example, when the outer circumferential end 2E of the noise prevention blade 22 is integrally injection-molded with the other members, only the outer circumferential end 2E is perpendicularly molded with respect to the shaft to be easily separated from the mold, and thus priority has been given to the manufacturability while blowing efficiency is sacrificed. In contrast to the above description, in the present embodiment, since each element is divided by the division line L, consideration of mold separation in the conventional technology may not be needed, and blowing efficiency may be improved by installing the convex surface 2C and the pressure surface 2P formed to be inclined toward the outer circumferential end 2E. In addition, since as illustrated in a top view illustrating the blower 100 in FIG. 9, the noise prevention blades 22 do not overlap when seen from the shaft, and as illustrated in FIG. 10A, the outer edge rib 232 is only formed at the outer edge part of the connection part 23, and because the upstream side is formed to be open, the molded blade part 2 may be easily molded by a mold divided along the shaft direction.

As described above, because molding property of the noise prevention blade 22 for the container-shaped molded object 1 is not needed, the shape of the bell mouth part 11 which expands from the substantially circular shape to the oval shape may also be molded by a simple mold. In addition, since a direction of the vertical rib 15 may be arranged by a half surface, the container-shaped molded object 1 may be molded by a mold divided into two along a radius direction, and thus manufacturability may be improved.

In addition, since the bell mouth part 11 and the diffuser part 12 are not separately formed, but are integrally formed as the container-shaped molded object 1, the blower 100 includes only two elements of the container-shaped molded object 1 and the molded blade part 2, and thus blowing efficiency is improved as well as the number of elements may also be decreased.

In addition, the other embodiments will be described.

Figure 13:
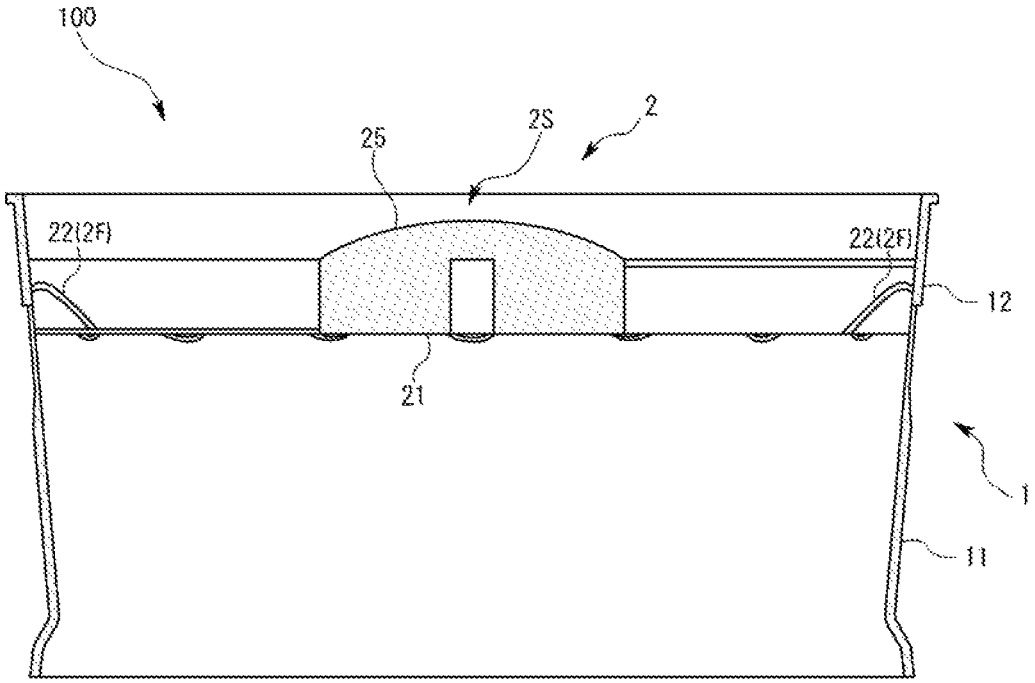
FIG. 13 is a schematic view illustrating a blower according to another embodiment of the present disclosure.

As illustrated in FIG. 13, a cover member 25 having a top surface in a dome-shaped curved surface to cover a downstream side (a top surface side) of a hub 21 may be installed to prevent a blower 100 from being damaged by being in contact with a bell mouth part 11 when snow is accumulated on a central portion of a propeller fan FN and a rotation shaft is shaken. In addition, the cover member 25 may be provided to be separable from the hub 21 so that cost is easily decreased by omitting the present structure in areas snow does not fall.

In the above-described embodiment, although the stator part 2F is formed by installing the noise prevention blade 22 into the diffuser part 12 in a radial shape, for instance, the plurality of noise prevention blades 22 having a shape expanding straight along a long or minor axis may be installed. Such a structure may improve blowing efficiency and also suppress a noise from being intensively increased at a specific frequency by varying lengths of the noise prevention blades 22. Although the downstream end of the diffuser part 12 has an oval shape, for instance, the downstream end may have a polygonal shape close to a circle or oval. In this case, it is preferable that a central point of the downstream end of the diffuser part 12 be disposed on the rotation shaft line of the propeller fan FN.

Various modifications or embodiments except for the above-described embodiments may be combined without departing from the purposes of the present.

The invention claimed is:

1. An outdoor unit for an air conditioner, comprising:

a first fan [having] *coupled to* a first rotation shaft;

a second fan [having] *coupled to* a second rotation shaft that is parallel to the first rotation shaft;

*a casing surrounding the first fan and the second fan in a vertical direction;* a first bell mouth part and a second bell mouth part, each of the first bell mouth part and the second bell mouth part to guide air introduced into the first fan and the second fan, respectively, while the first fan and the second fan respectively discharge the air, each of the first bell mouth part and the second bell mouth part having a downstream end and *being* spaced apart from outer circumferential ends of the first fan and the second fan, respectively;

a first diffuser part obliquely extending from the downstream end of the first bell mouth part to guide the air discharged from the first fan, the first diffuser part having a first inner circumferential surface inclined at first inclination angles with respect to the first rotation shaft, the first inclination angles varied along a circumferential direction of the first fan[;], *the first diffuser part forming a first opening at a downstream end of the first inner circumferential surface;* a second diffuser part obliquely extending from the downstream end of the second bell mouth part to guide the air discharged from the second fan, the second diffuser part having a second inner circumferential surface inclined at second inclination angles with respect to the second rotation shaft, the second inclination angles varied along a circumferential direction of the second fan, *the second diffuser part forming a second opening at a downstream end of the second inner circumferential surface;*

*wherein when a length of a major axis of the first opening is W and a length of a minor axis of the first opening is D, lengths of the first opening is set to satisfy 0.75<D/W<1, and*

*wherein when a length of a major axis of the second opening is W and a length of a minor axis of the second opening is D, lengths of the second opening is set to satisfy 0.75<D/W<1;* wherein[:]

*the first diffuser part and the second diffuser part are disposed inside the casing in the vertical direction,*

[a portion of]the first inner circumferential surface of the first diffuser part *at a minor axis of the first diffuser part* and [a portion of] the second inner circumferential surface of the second diffuser part *at a minor axis of the second diffuser part* are adjacent to each other,

[the portion of]the first inner circumferential surface of the first diffuser part *at the minor axis of the first diffuser part* is inclined at at least one first inclination angle from among the first inclination angles of the first diffuser part,

[the portion of]the second inner circumferential surface of the second diffuser part *at the minor axis of the second diffuser part* is inclined at at least one second inclination angle from among the second inclination angles of the second diffuser part, the at least one first inclination angle from among the first inclination angles of the first diffuser part is smaller than at least one other first inclination angle from among the first inclination angles of the first diffuser part, [and]

the at least one second inclination angle from among the second inclination angles of the second diffuser part is smaller than at least one other second inclination angle from among the second inclination angles of the second diffuser part, *and*

*a downstream end of the first diffuser part and a downstream end of the second diffuser part are surrounded by four side walls of the casing.*

[2. The outdoor unit according to claim 1, wherein:

the first diffuser part includes a first opening formed at a downstream end of the first inner circumferential surface;

the second diffuser part includes a second opening formed at a downstream end of the second inner circumferential surfaces; and the first opening and the second opening are formed to be opposite to each other.]

3. The outdoor unit according to claim [2] *1*, wherein each *of* the first inclination angles (θ) and the second inclination angles (θ) are each provided in a range of $3° \leq \theta \leq 35°$.

4. The outdoor unit according to claim [2] *1*, wherein:

a length of the first inner circumferential surface of the first diffuser part defined as a length between an upstream end and the downstream end of the first diffuser part increases as the inclination angle of the first diffuser part increases; and a length of the second inner circumferential surface of the second diffuser part defined as a length between an upstream end and the downstream end of the second diffuser part increases as the inclination angle of the second diffuser part increases.

5. The outdoor unit according to claim [2] *1*, wherein:

the rotation shaft of the first fan is disposed at a center of the first opening; and the rotation shaft of the second fan is disposed at a center of the second opening.

[6. The outdoor unit according to claim 2, wherein when a length of a major axis of the first opening is W and a length of a minor axis of the first opening is D, the lengths of the first and second openings are set to satisfy $0.75<D/W<1$.]

7. The outdoor unit according to claim 1, wherein:

[the first diffuser part includes a first opening formed at a downstream end of the first inner circumferential surface; and]

the first opening is provided in an oval shape.

8. The outdoor unit according to claim 1, wherein:

[the first diffuser part includes a first opening formed at a downstream end of the first inner circumferential surface; and]

the first opening is provided in a polygonal shape having at least three corners.

9. The outdoor unit according to claim 1, wherein the at least one first inclination angle (α) from among the first inclination angles of the first diffuser part and the at least one second inclination angle (α) from among the first inclination angles of the second diffuser part are each provided in a range of $3° \leq \alpha \leq 7°$.

10. The outdoor unit according to claim 1, [further comprising] *wherein*:

[a casing including]*the four side walls of the casing include*:

a first [surface] *wall* extending in a direction the first and second fans are disposed and to cover one side of the first fan and one side of the second fan, a second [surface] *wall* configured to cover the other side of the first fan and the other side of the second fan while disposed parallel to the first [surface] *wall*, a third [surface] *wall* configured to cover the first fan while disposed between the first [surface] *wall* and the second [surface] *wall*, and a fourth [surface] *wall* configured to cover the second fan while disposed parallel to the third [surface] *wall*; and at least one heat exchanger disposed between the casing and the first and second fans and formed along the third [surface] *wall*, the first [surface] *wall*, and the fourth [surface] *wall*.

11. The outdoor unit according to claim 10, wherein the heat exchanger formed along the third [surface] *wall*, the first [surface] *wall*, *and* the fourth [surface is also formed along at least a portion of] *wall extends toward* the second [surface] *wall*.

12. The outdoor unit according to claim 10, wherein the first inclination angles of the first diffuser part and the second inclination angles of the second diffuser part respectively have maximum values when the first diffuser part and the second diffuser part respectively face the first [surface] *wall* and the second [surface] *wall*.

13. The outdoor unit according to claim 10, wherein the first inclination angles of the first diffuser part and the second inclination angles of the second diffuser parts each have minimum values when the first diffuser part and the second diffuser part respectively face the third [surface] *wall*and the fourth [surface] *wall*.

14. An outdoor unit for an air conditioner, comprising:

[a pair of fans each having a rotation shaft provided vertically;]

a casing including four [surfaces] *walls* that extend vertically[while covering vertical sides of the pair of fans];

*a pair of fans, each coupled to a respective rotation shaft provided vertically and disposed inside the casing in a vertical direction;* a heat exchanger [disposed between the casing and the pair of fans and] extended along [at least] three [surfaces] *walls* of the four [surfaces] *walls*;

a pair of bell mouth parts respectively provided for the pair of fans and disposed to be spaced apart from outer circumferential ends of each of the pair of fans, each bell mouth of the pair of bell mouth parts configured to guide air introduced into a respective fan of the pair of fans while the pair of fans discharge the air, the pair of bell mouth parts respectively having downstream ends; [and]

a pair of diffuser parts respectively disposed at downstream ends of the pair of bell mouth parts and obliquely extending in directions toward which the air is to be discharged, to guide the air discharged from the pair of fans[.] *and the pair of diffuser parts including a pair of inner circumferential surfaces, respectively;*

*a pair of openings are respectively formed at downstream ends of the pair of inner circumferential surfaces and each of the pair of openings has a shape corresponding to each other;*

*wherein when a length of a major axis of the pair of openings is W and a length of a minor axis of the pair of openings is D, the lengths of the pair of openings are set to satisfy 0.75<D/W<1;* wherein

*the pair of diffuser parts are disposed inside the casing in the vertical direction,*

*downstream ends of the pair of diffuser parts are surrounded by the four walls of the casing,*

*the inner circumferential surface of* each of the pair of diffuser parts [have an inner circumferential surface] *is* inclined at an inclination angle that [are] *is* varied along circumferential [directions] *direction* of a respective diffuser part of the pair of diffuser parts with respect to respective rotation shaft of the rotation shafts of the pair of fans, and the inclination angle of the respective diffuser part has a minimum value at [first portions of] the inner circumferential surfaces where the pair of diffuser parts are adjacent to each other *at respective minor axes of the pair of diffuser parts*.

15. The outdoor unit according to claim 14, wherein at [the first portions of] *each of* the inner circumferential surfaces *at the respective minor axes of the pair of diffuser parts*, the inclination angle (θ) of the respective diffuser part of the pair of diffuser parts is provided in a range of $3° \leq \theta \leq 7°$.

16. The outdoor unit according to claim 14, wherein the inclination angle (θ) of the respective diffuser part of the pair of diffuser parts is provided in a range of $3° \leq \theta \leq 35°$.

[17. The outdoor unit according to claim 14, wherein:

a pair of openings is respectively formed at downstream ends of the pair of inner circumferential surfaces; and each of the pair of openings has a shape corresponding to each other.]

18. The outdoor unit according to claim [17] *14*, wherein each opening of the pair of openings is provided in an oval shape.

[19. The outdoor unit according to claim 17, wherein each opening of the pair of openings are provided in a polygonal shape having at least three corners.]

20. The outdoor unit according to claim [17] *14*, further comprising a pair of stator parts, each stator of the pair of stator parts including a plurality of noise prevention blades, wherein the pair of stator parts are respectively provided on the pair of inner circumferential surfaces.

*21. An outdoor unit for an air conditioner, comprising:*

*a casing including four walls that extend vertically;*

*a pair of fans, each coupled to a respective rotation shaft provided vertically and disposed inside the casing in a vertical direction;*

*a heat exchanger extended along at least three walls of the four walls of the casing;*

*a pair of bell mouth parts respectively provided for the pair of fans and disposed to be spaced apart from outer circumferential ends of each of the pair of fans, each bell mouth of the pair of bell mouth parts configured to guide air introduced into a respective fan of the pair of fans while the pair of fans discharge the air, the pair of bell mouth parts respectively having downstream ends;*

*a pair of diffuser parts respectively disposed at downstream ends of the pair of bell mouth parts and obliquely extending in directions toward which the air is to be discharged, to guide the air discharged from the pair of fans and the pair of diffuser parts including a pair of inner circumferential surfaces, respectively, and*

*a pair of openings respectively formed at downstream ends of a pair of inner circumferential surfaces, each of the pair of openings has a shape corresponding to each other;*

*wherein when a length of a major axis of the pair of openings is W and a length of a minor axis of the pair of openings is D, the lengths of the pair of openings are set to satisfy 0.75<D/W<1;*

*wherein*

*the pair of diffuser parts are disposed inside the casing in the vertical direction,*

*the inner circumferential surface of each of the pair of diffuser parts is inclined at a diffuser angle that is varied along circumferential direction of a respective diffuser part of the pair of diffuser parts with respect to the respective rotation shaft of the rotation shafts of the pair of fans, and the inclination angle of the respective diffuser part has a minimum value at first portions of the inner circumferential surfaces where the pair of diffuser parts are adjacent to each other.*

*each of the pair of diffuser parts, in a major axis direction from a front to a rear, has a first diffuser angle,*

*each of the pair of diffuser parts, in a minor axis direction from one side to another side, has a second diffuser angle,*

*the second diffuser angle is smaller than the first diffuser angle, and*

*downstream ends of the pair of diffuser parts are surrounded by the four walls of the casing.*

*22. The outdoor unit according to claim 21, wherein the pair of diffuser parts is disposed inside the casing in a vertical direction.*

*23. The outdoor unit according to claim 21, wherein, for each of the diffuser parts, the second diffuser angle is a lowest diffuser angle among a plurality diffuser angles along circumferential directions of the diffuser part.*

*24. The outdoor unit according to claim 21, wherein the first diffuser angle is a highest diffuser angle among a plurality of diffuser angles along circumferential directions of the diffuser part.*

*25. The outdoor unit according to claim 23, wherein the second diffuser angle is provided in a range of $3° \leq \theta \leq 7°$.*

*26. The outdoor unit according to claim 24, wherein the first diffuser angle is provided in a range of $3° \leq \theta \leq 35°$.*

*27. The outdoor unit according to claim 21, wherein each opening of the pair of openings is provided in an oval shape.*

*28. The outdoor unit according to claim 1, wherein*

*a distance from a center of rotation of the first fan to a corner of the casing, formed by two side walls of the four side walls of the casing, is defined by L1+L2,*

*wherein L1 is a distance from the corner of the casing to an outer edge of the first diffuser part, L2 is a distance from the center of rotation of the first fan to the outer edge of the first diffuser part, and Dratio=L2/(L1+L2) satisfies 0.60≤Dratio≤0.95.*

*29. The outdoor unit according to claim 14, wherein*

*a distance from a center of rotation of a fan of the pair of fans to a corner of the casing, formed by two side walls of the four side walls of the casing, is defined by L1+L2,*

*wherein L1 is a distance from the corner of the casing to an outer edge of a diffuser part of the pair of diffusor parts, L2 is a distance from the center of rotation of the fan of the pair of fans to the outer edge of the diffuser part of the pair of diffuser parts, and Dratio=L2/(L1+L2) satisfies 0.60≤Dratio≤0.95.*

*30. The outdoor unit according to claim 21, wherein*

*a distance from a center of rotation of a fan of the pair of fans to a corner of the casing, formed by two side walls of the four side walls of the casing, is defined by L1+L2,*

*wherein L1 is a distance from the corner of the casing to an outer edge of a diffuser part of the pair of diffuser parts, L2 is a distance from the center of rotation of the fan of the pair of fans to the outer edge of the diffuser part of the pair of diffuser parts, and Dratio=L2/(L1+L2) satisfies 0.60≤Dratio≤0.95.*

* * * * *